(12) United States Patent
Schill

(10) Patent No.: US 9,916,463 B2
(45) Date of Patent: Mar. 13, 2018

(54) CAMOUFLAGED COMMUNICATION DEVICE

(71) Applicant: The Board of Regents of Nevada System of Higher Education on Behalf of the University of Nevada, Las Vegas, Las Vegas, NV (US)

(72) Inventor: Robert A. Schill, Henderson, NV (US)

(73) Assignee: The Board of Regents of Nevada System of Higher Education on Behalf of the University of Nevada, Las Vegas, Las Vegas, NV (US)

( * ) Notice: Subject to any disclaimer, the term of this patent is extended or adjusted under 35 U.S.C. 154(b) by 163 days.

(21) Appl. No.: 14/908,398

(22) PCT Filed: Jul. 31, 2014

(86) PCT No.: PCT/US2014/049235
§ 371 (c)(1),
(2) Date: Jan. 28, 2016

(87) PCT Pub. No.: WO2015/017700
PCT Pub. Date: Feb. 5, 2015

(65) Prior Publication Data
US 2016/0162696 A1    Jun. 9, 2016

Related U.S. Application Data

(60) Provisional application No. 61/860,468, filed on Jul. 31, 2013.

(51) Int. Cl.
*H04L 29/06* (2006.01)
*G06F 21/60* (2013.01)
*G09C 1/00* (2006.01)
*H04L 9/00* (2006.01)
*H04K 1/02* (2006.01)
*H04K 3/00* (2006.01)

(52) U.S. Cl.
CPC ............. *G06F 21/606* (2013.01); *G09C 1/00* (2013.01); *H04K 1/02* (2013.01); *H04K 3/25* (2013.01); *H04K 3/43* (2013.01); *H04K 3/65* (2013.01); *H04K 3/825* (2013.01); *H04L 9/001* (2013.01); *H04L 63/02* (2013.01); *H04L 63/1483* (2013.01); *H04K 2203/32* (2013.01); *H04L 2209/12* (2013.01)

(58) Field of Classification Search
CPC .......... G06F 21/606; G09C 1/00; H04K 1/02; H04K 3/25; H04K 3/43; H04K 3/825; H04L 9/001; H04L 63/02; H04L 63/1483
USPC .......................................... 726/26
See application file for complete search history.

(56) References Cited

U.S. PATENT DOCUMENTS

| | | | | |
|---|---|---|---|---|
| 3,897,591 A | * | 7/1975 | Lundstrom | H04K 1/02 380/253 |
| 5,963,169 A | * | 10/1999 | Anderson | H01Q 1/26 343/701 |
| 2012/0213513 A1 | * | 8/2012 | Chao | H04K 3/42 398/39 |

* cited by examiner

*Primary Examiner* — Michael S McNally
(74) *Attorney, Agent, or Firm* — Ballard Spahr LLP

(57) ABSTRACT

A transmission system is used in a method of transmitting a camouflaged transmission of signals by generating an underlying transmission comprising a plasma transmission discharge constituting background noise having a first amplitude and generating an embedded transmission of signals within the underlying transmission.

12 Claims, 20 Drawing Sheets

FIG. 11

| CHARACTERISTIC | PERFORMANCE REQUIREMENT | SUPPLEMENTAL INFORMATION |
|---|---|---|
| RISETIME<br><br>10-foot probe<br>25-foot probe | < 4.5 ns<br>< 50 ns | Zsource = 25 ohms |
| BANDWIDTH (-3db)<br><br>10-foot probe<br>25-foot probe | < 4.5 ns<br>< 50 ns | Test Oscilloscope must be > 100 MHz |
| DELAY TIME<br><br>10-foot probe<br>25-foot probe | Approximately 10 ns<br>Approximately 25 ns | |

CAMOUFLAGED COMMUNICATION DEVICE

CROSS REFERENCE TO RELATED PATENT APPLICATION

This application claims the benefit of and priority under 35 U.S.C. § 371 of PCT/US2014/049235, filed Jul. 31, 2014, which claims the benefit under 35 U.S.C. § 119(e) of U.S. Provisional Application No. 61/860,468 filed Jul. 31, 2013, which are herein incorporated by reference in their entireties.

GOVERNMENT CONTRACT NOTICE

This invention was made with government support under FA9550-08-1-0045 awarded by the USAF/AFOSR. The government has certain rights in the invention.

BACKGROUND

Plasma antennas are being considered for use in many different industrial fields. A plasma antenna is a type of radio antenna in which plasma is used instead of the metal elements of a traditional antenna. A plasma antenna can be used for both transmission and reception. Early practical examples of the technology used discharge tubes to contain the plasma and are referred to as ionized gas plasma antennas. Ionized gas plasma antennas can be turned on and off and are good for stealth and resistance to electronic warfare and cyber-attacks. Ionized gas plasma antennas can be nested such that the higher frequency plasma antennas are placed inside lower frequency plasma antennas. Higher frequency ionized gas plasma antenna arrays can transmit and receive through lower frequency ionized gas plasma antenna arrays. This means that the ionized gas plasma antennas can be co-located and ionized gas plasma antenna arrays can be stacked. Ionized gas plasma antennas can eliminate or reduce co-site interference. Smart ionized gas plasma antennas use plasma physics to shape and steer the antenna beams without the need of phased arrays. Satellite signals can be steered and/or focused in the reflective or refractive modes using banks of plasma tubes making unique ionized gas satellite plasma antennas. The thermal noise of ionized gas plasma antennas is less than in the corresponding metal antennas at the higher frequencies. Solid state plasma antennas (also known as plasma silicon antennas) with steerable directional functionality that can be manufactured using standard silicon chips are now also in development.

Phased array antennas are disclosed in U.S. Pat. No. 4,905,014 issued to Gonzalez et al. In general, a microwave phasing structure includes a support matrix, i.e., a dielectric substrate, and a reflective means, i.e., a ground plane, for reflecting microwaves within the frequency-operating band. The reflective means is supported by a support matrix. An arrangement of electromagnetically loading structures is supported by the support matrix at a distance from the reflective means, which can be less than a fraction of the wavelength of the highest frequency in the operating frequency range. The electromagnetically loading structures are dimensioned, oriented, and interspaced from each other and disposed at a distance from the reflective means, as to provide the emulation of the desired reflective surface of selected geometry. Specifically, the electromagnetically-loading structures form an array of metallic patterns, each metallic pattern preferably being in the form of a cross, i.e., X configuration. It is disclosed that each electromagnetically-loading structure can be constructed to form different geometrical patterns and, in fact, could be shorted crossed dipoles, metallic plates, irises, apertures, etc. It is further disclosed that the microwave phasing structures of Gonzalez et al. (014) patent may be used for electromagnetically emulating a desired microwave-focusing element of a selected geometry.

The selected geometry of the desired reflective surface can be a parabolic surface in order to emulate a parabolic reflector wherein all path lengths of the reflected incident electromagnetic waves are equalized by phase shifting affected by the microwave phasing structure of the present disclosure. While the microwave phasing structure may emulate desired reflective surfaces of selected geometries such as a parabola, the microwave phasing structure is generally flat in shape. However, the shape of the microwave phasing structure may be conformal to allow for mounting on substantially non-flat surfaces.

U.S. Pat. No. 7,474,723 (Pavliscak) discloses a gas plasma antenna with a rigid, flexible, or semi-flexible substrate and an improved method of generating a uniform electron density. The antenna has a plasma display panel (PDP) containing a multiplicity of Plasma-shells, each Plasma-shell containing a gas which is ionized to produce electron density. Each Plasma-shell acts alone or in concert with other Plasma-shells to form a dipole or pattern of dipoles. In a phased array plasma antenna characterized by a plurality of localized gas discharge areas, each gas area is selectively and sufficiently ionized to form a reflector to incident radiation, the improvement wherein: each localized gas discharge area is confined within a gas encapsulating Plasma-shell, each Plasma-shell affixed to a substrate, at least two or more electrodes in contact with each gas encapsulating Plasma-shell, said electrodes being affixed to or embedded within the substrate, and AC electronic circuitry including address and sustain waveform electronics for addressing and sustaining the electrodes so as to selectively ionize a gas within a Plasma-shell and produce a controllable level of electron density over time within each Plasma-shell, each Plasma-shell acting alone or in concert with other Plasma-shells to form dipoles or patterns of dipoles.

U.S. Pat. No. 5,963,169 (Anderson) describes an antenna in which electromagnetic signals in the High Frequency and Super High Frequency bands are propagated utilizing ionized gas, or plasma. Energized electrodes ionize the gas and the plasma is confined within non-metallic coaxial tubes contained within a non-metallic pressure vessel. Electric field gradients are used to change the shape and density of the plasma to affect the gain and directivity of the antenna. The inner plasma tube acts as the radiating source, while the outer plasma tube is used to change the radiation of the inner tube and to reflect the radiated signal. Instrumentation measures the density of the plasma providing a means to measure incoming signals as well as to regulate the radiation frequency.

Published U.S. Patent Document 20030142021 Anderson) describes an antenna system and method for a plurality of plasma antennas driven by means of an optical driver. In one embodiment the driver comprises one or more lasers which may be modulated by one or more electro-optical modulators to produce a modulated laser signal. The modulated laser signal may be supplied to the plasma antenna by optical fibers whereby the photons from the modulated signal impart momentum to the plasma particles. The plasma particles, which may include unbound electrons, oscillate in accord with the modulated laser signal to radiate electromagnetic energy. In one embodiment, the plasma antenna is operated at a frequency near the resonant frequency of the plasma to form a more efficient radiator requiring a smaller size than to a metallic antenna. In another embodiment a plurality of closely spaced plasma antennas are operated with different plasma resonant frequencies such that one plasma antenna is electrically invisible with respect to another plasma antenna.

In an ionized gas plasma antenna, a gas is ionized to create a plasma. Unlike gases, plasmas have very high electrical conductivity so it is possible for radio frequency signals to travel through them so that they act as a driven element (such as a dipole antenna) to radiate radio waves, or to receive them. Alternatively the plasma can be used as a reflector or a lens to guide and focus radio waves from another source. Solid-state antennas differ in that the plasma is created from electrons generated by activating thousands of diodes on a silicon chip.

Commonly assigned U.S. Provisional Patent Application U.S. Ser. No. 61/767,059 (Schill, filed 13 Mar. 2013) describes, amongst other technology, a plasma generating system that can be used, among other purposes, to enable practice of the present technology by generating the plasma field containing information camouflaged therein. That reference, and all references cited herein, are incorporated in their entirety herein.

That technology relates to the fact that a simple nonlinear theory has been developed to capture the essence and process of electron channeling for an energetic electron beam passing through a cool plasma. In this model, the electron species is separated into two different species of the same type but with very different initial particle states immersed in a sea of nearly stationary ions. Under appropriate conditions, theory suggests that the fast moving secondary electron emission particles passing through a discharge may be responsible for a non-arc-like plasma pinch effect that results in experiments with periodic pulse discharge. In certain periodic pulsed plasma discharge experiments, it has been observed that under specific conditions a plasma glow discharge column is generated and tends to seek the central location of the discharge electrodes away from the electrode edges and chamber walls. Further, the column appears to have the properties of a stabilized equilibrium plasma pinch in a glow (non-arc-like) state. This is unusual since, normally field enhancements occur on edges of the electrode resulting in arc-like discharge breakdown. Also, the column of plasma that protrudes from the anode emits highly intense, non-uniform light that is uncharacteristically bright for a typical glow discharge with the same applied voltage. It appears that under certain conditions and assumptions, the secondary electron beam will initiate and sustain electron channeling and subsequent pinch forces due to charge repulsion, charge neutralization, and self-magnetic forces. This theory can be expanded beyond a glow discharge and be applied to any moderately energetic beam that passes through plasma, as long as the assumptions and conditions are not violated. An apparatus was also constructed to investigate this phenomenon. It delivers controlled pulses that generate stable and repetitive pinched discharges. It allows the user to change the parameters and the conditions of the discharge and to study the conditions that bring about plasma constriction. Measurement tools were integrated into the system including current and voltage probes and image analysis tools. Based on the models developed and on experimental implications, a parameter space based on the properties of the discharge has been identified that leads to the pinch of the discharge. Further, from transient discharge measurements, various properties of the pinch have been identified.

SUMMARY

Camouflaged communication is a way to maintain bandwidth while disguising a communication signal with a wide range of pulsed parameters in a sea or background of natural electronic noise. With one party knowing enough about the original parameters of the signal that is to be camouflaged, a masked signal with low-signal-to-noise ratio may be extracted by a targeted receiver from within the total noise spectrum. The use of camouflaged communication may inhibit jamming and "spoofing" techniques, while relaxing the need for a dedicated wide bandwidth with complex command, control and communication systems. ("Spoofing" or a spoofing attack is a situation in which one person or program successfully masquerades as another by falsifying data and thereby gaining an illegitimate advantage.)

In an aspect, this capability can be based on a "controlled plasma antenna" (see U.S. Provisional Patent Application Ser. No. 61/767,059 (Schill, filed 13 Mar. 2013) with a high-voltage, high current mixer. This controlled plasma antenna technology offers the capability of hiding the intended low signal-to-noise ratio transmitted signal in a background of plasma noise. This technology can be used in combination with existing modulator technology. Camouflaged communication signal generation and transmission strength over long distances can be optimized to enable high quality extraction of the transmitted signal from the noise background based on limited information.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification, illustrate embodiments and together with the description, serve to explain the principles of the methods and systems:

FIG. 11 shows Tektronix P6015 high voltage probe specifications. Found in Tektronix P6015 datasheet;

DETAILED DESCRIPTION

Figure 1:
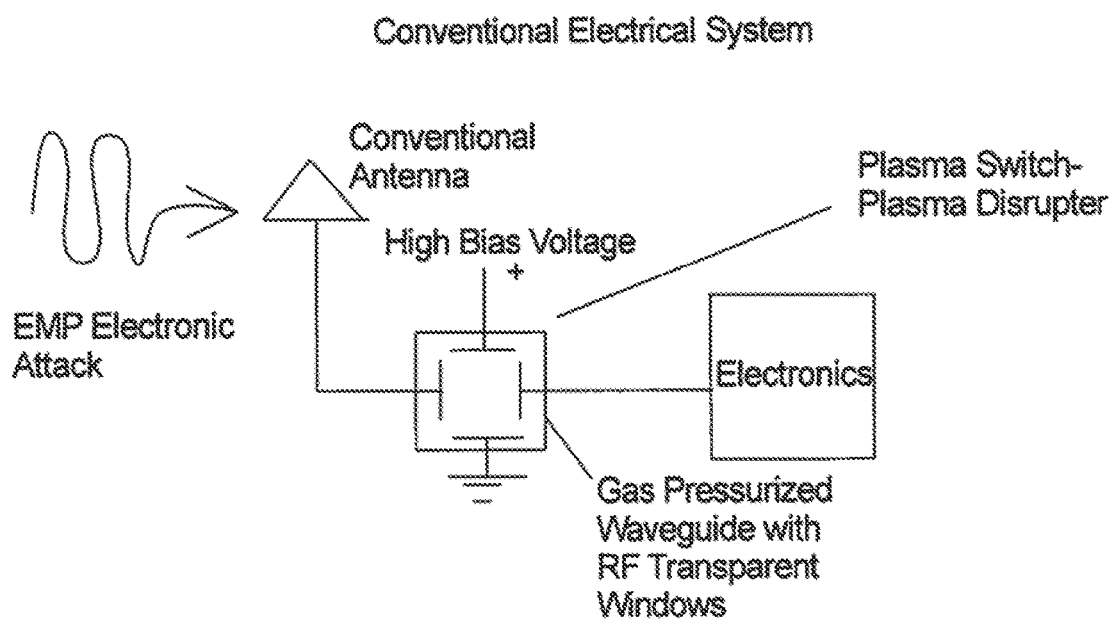
FIG. 1 shows example placement of invention between an antenna and shielded electronics making use of a capacitive coupling arrangement.

Before the present methods and systems are disclosed and described, it is to be understood that the methods and systems are not limited to specific methods, specific components, or to particular configurations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the Examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Figure 2:
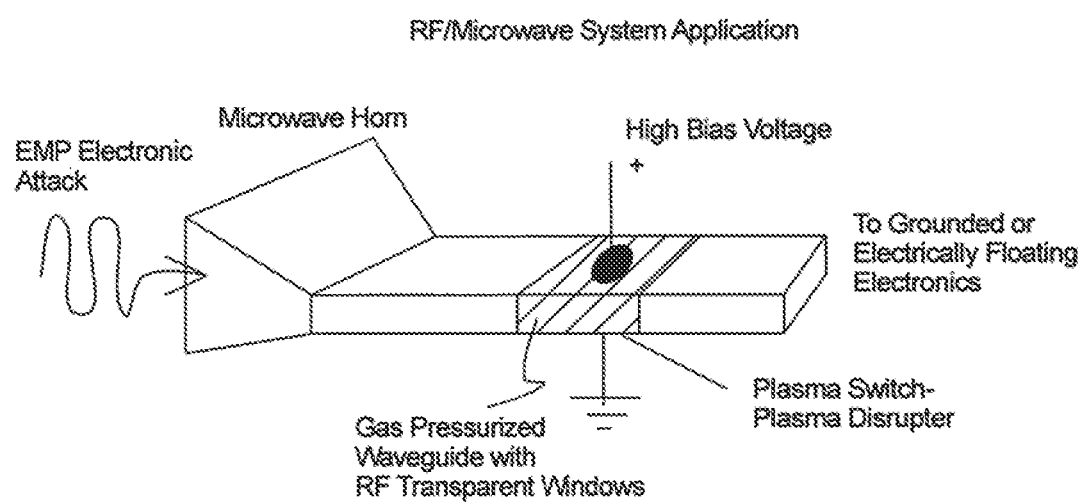
FIG. 2 shows example placement of invention in a waveguide between a horn or aperture antenna and shielded electronics.

The technology from co-pending U.S. Provisional Patent Application Ser. No. 61/767,059 (Schill, filed 13 Mar. 2013) includes enablement of a switch, an apparatus, and a method that can harness the physics of electromagnetic pulses (EMP) on electronics to control violent or destructive arc-like discharges (similar to lightning) that can occur during breakdown of the electronics by mitigating access through any portal within the electronic equipment. The switch can generate a self-triggered, gentle, intense, constricted glow that ultimately closes the portal to the EMP and does not significantly damage the switch electrodes of the electronic system. This leads to a controlled release of charge or pulsating charge dependent on external circuitry and the external field. The actual physics of the discharge is different from that at low pressure. The switch is turned "on" when the undesired external fields in conjunction with the fields of the DC biased plates exceeds a tuned threshold. Once on, the discharge pulsates at a controlled repetition rate. If the external field falls below a threshold, the pulsing nature of the discharge automatically turns the switch off allowing for normal operations of the electronics. FIG. 1 and FIG. 2 give two different scenarios on how the device can be used and can be fitted into the circuit between the antenna and the electronics. In the conventional electrical system, the unit is AC coupled to the electronics. The magnitude of the electric field amplitude generated between both sets of plates, E1 and E2, yields a resultant field $E=(E1^2+E2^2)^{0.5}$ which is responsible for the breakdown of the gas. Breakdown is also associated with a Paschen effect. In the rf/microwave system application, the electromagnetic wave is capture by a waveguide. The wave generates an electric field which when appropriately combined with the biased electric field results in the generation of the discharge if high enough.

A device according to this technology can comprise an electromagnetic plasma disrupter device comprising: a) a gas pressurized wave guide or non-wave guide chamber fully enclosing b) two opposed pairs of electrodes, a first pair of opposed electrodes present within the chamber being in series between the antenna and the electronics, and the second pair of opposed electrodes having a ground connection on one electrode of the second pair and a variable voltage of at least 250 volts applied on the second electrode of the second pair of opposed electrodes.

An actual structure of a device effecting the pulse protection on a standard electronic device can comprise an electronic system comprising an antenna and electronics and a plasma disrupter positioned between the antenna and the electronics configured to protect the electronics against an electromagnetic pulse. The concern is that the electromagnetic pulse could impact the antenna which could be transmitted from the antenna to the electronics. In an aspect, the plasma disrupter can comprise a gas pressurized wave guide or non-wave guide chamber (or housing) fully enclosing two opposed pairs of electrodes, a first pair of opposed electrodes in series between the antenna and the electronics, and the second pair of opposed electrodes having a ground connection on one electrode of the second pair and a high bias voltage applied the second electrode of the second pair of opposed electrodes. The gas pressurized chamber or housing can operate at pressures with low vacuums ranging from about 0.1 Torr to about 100 Torr. To allow for rf and microwave power transmission, the housing containing the vacuum and the electrodes can have rf transparent windows. Upon interception of an electromagnetic pulse that would otherwise damage (if not destroy) the electronics associated with the antenna, the plasma switch disrupts any electromagnetic surge across the electrodes in series between the antenna and the electronics. The nature of the electronics is not significant, as any electronics can be protected against any EMP. For example, computers, video equipment, broadcasting equipment, medical equipment, electric locomotives, receiving equipment, radios, cell phones, broadcast towers, satellites, etc. can be protected.

The present disclosure relates to electromagnetic shielding products. Other applications include the high voltage electric switching industry. In an aspect, the methods, systems, and apparatuses disclosed can use the modulated discharge plasma wire as an antenna for camouflaged communication with a periodic discharge pulse rate masked with typical plasma discharge noise. For clarity, the modulation of the discharge may or may not be separate from the pulse repetition rate required to generate the plasma wire. The discharge appears to have diode-like properties, where current only flows after reaching a threshold voltage. Also, reverse currents have never been observed (beyond a fraction of peak current), which is another diode-like effect By controlling the state in which the secondary electrons are generated within a DC or pulsed plasma discharge, the nature of the secondary electrons can collectively redistribute the thermal ions and thermal electrons in the discharge to form a plasma wire, a nearly equilibrium pinch to act as a "Plasma Shield" barrier to large external destructive electromagnetic or EMP signatures.

Plasma, the fourth state of matter, can be simply described as a fluid that contains free electrons, ions and neutral atoms. It is created through the process of ionization. To be considered a plasma, the gas must also exhibit quasi-neutrality and collective behaviors where long range electric, magnetic, and/or electromagnetic fields can influence the nature of the medium.

To understand the term "collective behavior," consider a gas which has very few ionized particles. If the gas density (and temperature) is large enough, each ion is almost completely free of influence from long range forces such as inter-electromagnetic and inter-gravitational forces. Localized, direct contact collisional forces dominate over the long range forces and dictate the motion of the ion. This localized influence and lack of long range influence means a neutral gas does not exhibit the properties of a plasma.

In contrast, a plasma contains enough ionized particles to allow electromagnetic forces and effects among these particles to dominate plasma behavior. In other words, electromagnetic effects have more significant influence on the charged particles than the influence of short range billiard-ball like collisions. As particles move around they create local concentrations of charge resulting in the generation of net electric and magnetic fields. These fields can have a long range effect on particles far away in the plasma. Thus the motion of particles in a plasma not only depend on local collisions, but also on the state and behavior of particles in remote regions as well. This communication and connection of particles is described as collective behavior and is necessary for the ionized gas to be considered a plasma.

The condition of quasi-neutrality means that in each volume element composing the plasma medium on a macroscopic level there are nearly equal number of localized positive and negative charges. The large mass ratio between ions and electrons (under appropriate conditions, ions are modeled as being stationary compared to electrons) suggests that the electrons are more mobile than the ions assuming all other conditions are the same. The electron plasma frequency is much larger than the ion plasma frequency since $m_i m_e \sim 1836$. When a voltage is applied between two electrodes containing a plasma medium in a thermodynamic equilibrium, the light free moving electrons near the electrodes typically respond to the penetrating fields faster than the heavier, slow moving, ions since energy is linearly proportional to the square of the speed times the mass of the charge. Sheath formation results at both electrodes. At the anode, the fast moving electrons enter the sheath region at a greater rate compared to slow moving ions near either the anode or the cathode. The energetic electrons have enough energy to overcome space charge effects at the anode giving rise to a higher loss of negative charge in the plasma. The same effect occurs at the cathode but the number of ions reaching the cathode sheath is lower because they move slower. Once an equilibrium is attained, the plasma potential is typically the most positive potential in a system.

This negative voltage difference in all sheaths creates a situation in which ions are accelerated through the sheaths as they randomly arrive. They must arrive to the sheath with a certain amount of kinetic energy provided by the small potential that "leaks" into the plasma. The criterion characterizing this effect is called the Bohm Criterion.

These properties of plasmas create rich behaviors that can be used in many applications. For example, plasmas can be used to conduct large currents, to reflect electromagnetic waves, and as antennas to transmit rf signals.

A DC discharge is not an ideal plasma as described above, although it does have regions that approach the plasma model. These discharges have regions of weakly ionized gases and they are sustained by a DC electric field. A typical DC discharge experiment contains two electrodes separated by a specific distance and held at a certain pressure. After a high enough DC voltage is applied, breakdown occurs and current flows.

Figure 3A:
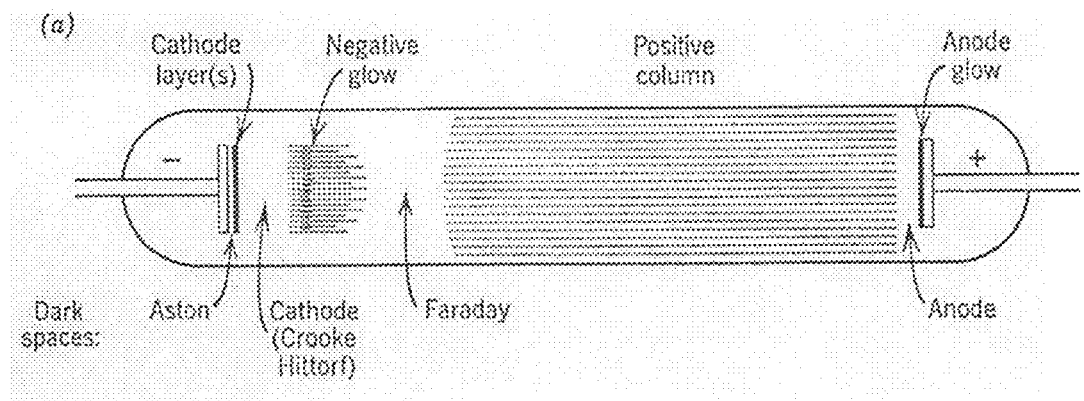
FIGS. 3a, b illustrates the various regions of a glow discharge a) from a typical discharge tube shading the relative light intensities of each region, b) and actual glow discharge with constricted pinch generated with the methods and systems of the present disclosure.
Figure 3B:
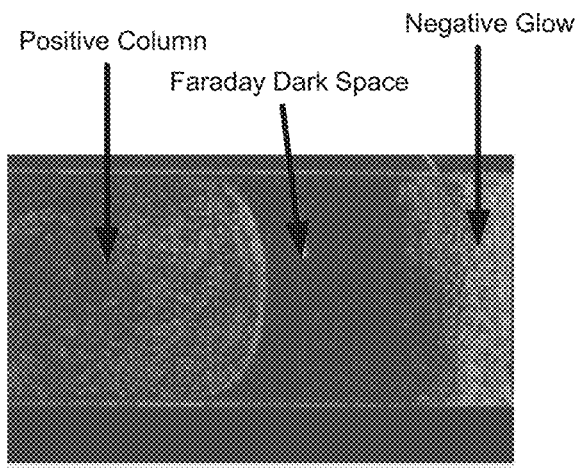

There are different regions within a DC glow discharge each with their own kinetics and properties. Referring to FIG. 3A and FIG. 3B, the regions are:
1. cathode layer(s)
2. cathode dark space
3. negative glow
4. Faraday dark space
5. positive column
6. anode dark space
7. anode glow Consider the cathode dark space. Since there is no visible light in the cathode sheath, one can observe experimentally that ionization is likely limited in this region (Light is created mainly by relaxation and recombination. Ionization and excitation processes have similar energy versus cross section curves. Though, excitation occurs at slightly lower energies than ionization.). Consequently, the processes that occur here are not expected to give rise to significant ionization (B. Chapman, "Glow discharge processes: sputtering and plasma etching," New York, N.Y.: John Wiley and Sons, 1980.).

FIG. 3A illustrates the various regions of a glow discharge from a typical discharge tube shading the relative light intensities of each region (B. Chapman, "Glow discharge processes: sputtering and plasma etching," New York, N.Y.: John Wiley and Sons, 1980.). FIG. 3B illustrates actual glow discharge with constricted pinch generated with the methods and systems of the present disclosure.

A large potential difference occurs across this region (cathode dark space). This potential causes ions that happen to reach the sheath interface to be accelerated to the cathode. These ions are not expected to create much ionization, however they do emit a significant number of secondary electrons after they strike the target (B. Chapman, "Glow discharge processes: sputtering and plasma etching," New York, N.Y.: John Wiley and Sons, 1980.).

The secondary electrons are then accelerated into the plasma attaining kinetic energies nearly equal to the sheath voltage drop. It has been determined that there is little spread in these emitted electrons' kinetic energy at the sheath-to-glow edge. These results imply that electrons are accelerated fully without significant collisions, which would use up kinetic energy and create a wider distribution of electron energy. This also supports the assumption that ionization does not occur in this region. These high speed electrons continue to travel into the glow region.

The other sheath region to consider is the anode region at the end of the positive column. Although the anode is held at a positive voltage with respect to the cathode, it is not necessarily the most positive voltage in the system. This occurs as a natural result of the limited number of electrons in the plasma and their more mobile nature (relative lower mass and higher thermal speed). Therefore, electrons are repelled in both sheath regions, near the cathode and near the anode. The anode sheath potential difference is much smaller than the cathode sheath potential difference. The anode is struck with ions, photons and electrons with various energies, and so the secondary electron emission is high providing low energy electrons to the glow and positive column regions.

There are three energy regimes of electrons within the negative glow region. First, primary electrons are the high energy electrons provided by the cathode sheath. These are the secondary electrons emitted from the cathode. The next regime are secondary electrons which are produced from recent ionizing collisions resulting in a partial loss of the primary electron's energy or possibly low energy electrons generated from the anode sheath. Finally, ultimate electrons have been thermalized to the plasma temperature and are the most common of the three electron constituents.

The highly energetic primary electrons have a high probability of not suffering an ionizing collision upon passing through the negative glow region, reaching subsequent regions with enough energy to overcome the potential hills in the discharge. As the energy of an electron increases from a threshold value, the ionizing cross-section increases, which means an increase in the probability of ionization. After a certain energy, however, the cross-section decreases with increasing energy. This is the reason energetic primary electrons (initially called secondary electrons in the cathode sheath region) make it easily through the glow with a low probability of performing an ionizing collision. A small percentage of primary electrons do ionize though. Plus, primary electrons generate secondary electron emission at the anode. Primary electrons are directional and generally move quickly from cathode towards the anode.

Thermal electrons, though many may have average energies below the minimum energy required to ionize a gas molecule, do contribute a great deal of ionization. Others characterize the energy distribution of these electrons with a Maxwell-Boltzmann energy distribution. The electrons at the tail end of the distribution have enough energy to ionize. Plus, ionization can occur in a two-step process. First neutrals are excited (which requires less energy than a single step ionization), then it is only a small step to ionization. Even though the momentum transfer is small due to the large mass ratio between protons and electrons, others suggest through these processes that thermal electrons contribute to all or almost all of the ionization needed to sustain a glow.

After passing the negative glow region, a dark region is encountered called the Faraday dark space. Beyond the dark region is a luminous region known as the positive column. Further on, the glow discharge may have anode glow and dark space regions, but it may not. In many discharges, the positive column fills the gap from the end of the Faraday dark space to a small localized region just before the anode.

Most positive column theories take only three effects into account: ionization, diffusion, and recombination. One major classical theory was described by Schottky who laid out a theory of the positive column that predicts macroscopic parameters such as the temperature of electrons, axial electric field strength, plasma density at the axis ($n_0$), and the radial distribution of the plasma. This theory is inaccurate under certain operating conditions. One phenomenon that cannot be explained by Schottky's theory is the contraction of the positive column at high pressures. The observation has been described as: when the pressure in a discharge tube is increased for a specific current, then the positive column (or the visible light) no longer extends all the way to the walls and it becomes slowly contained in the central region of the tube. The mechanism of constriction is unclear, but it has been predicated that at higher pressures the volume recombination rate becomes larger than the ambipolar diffusion rate to the walls and electron temperature is higher at the axis, causing a net ionization at the center of the tube and a net recombination away from the center. This would effectively contain the charges near the axis.

A thorough review of this phenomenon was published in the fall of 2011 by Yu. B. Golubovskii et al. (Y. B. Golubovskii, V. Nekuchaev, S. Gorchakov and D. Uhrlandt, "Contraction of the positive column of discharges in noble gases," *Plasma Sources Sci. Technol.*, vol. 20, pp. 053002). Yu chronicles much of the experimental and theoretical work performed on the contracted positive column. By generalizing Schottky's methods, researchers have developed theories to explain the constricted glow discharge. The balance of charged particles is given by:

$$D_a \Delta n + I(n,T) - \Gamma(n,T) = 0 \qquad (1)$$

where $D_a$ is the ambipolar diffusion coefficient, I is the rate of ionization and $\Gamma$ is the rate of recombination.

Extra anecdotal evidence of the constriction of glow discharges can be found. Significant constriction occurs in a hemisphere-to-water DC discharge as current increases beyond the breakdown current. It has also been found that as the pressure increases, the area of discharge decreases.

The theories reviewed by Golubovskii are purely DC glow discharges, and therefore they have a low voltage across the cathode dark space. This is important because it means that the electron beam (secondary electrons) emitted at the cathode will have an extremely high collisional cross section, and thus it is less likely the beam will penetrate past the negative glow region. Thus, they are allowed to treat the plasma in a very simplified way; a way that allows Eq. (1) to be used.

Eq. (1) and the theories that rely on it cannot be used when the effects of a highly energetic electron beam need to be considered. That is, the gas/plasma is composed of thermal ions, thermal electrons, and (primary) beam electrons. For one, the introduction of this third species (energetic primary beam electrons) will create a charge imbalance which is not included in the equation. Plus, the charge imbalance creates a strong non-equilibrium condition. Equilibrium will eventually ensue, as will be shown, but it cannot be assumed right at the onset as Eq. (1) does. If the electron beam emitted at the cathode reaches the anode with high energy, then pressure forces (diffusion) and collisions may not be the dominant interaction (or coupling effect) between the plasma and the beam. If the electron beam emitted at the cathode reaches the anode with high energy, then collisions are only a small decelerating effect. Further, because of its electrical nature and its transient nature, the electron beam cannot be assumed to be in equilibrium with collision forces and Eq. (1) cannot be used on the beam. Instead, beam dynamics should be used in unison with plasma fluid models. Charge expulsion, ion channel formation, and magnetic forces should be the dominant roles considered. Collision and pressure equilibrium models do not suffice as the central role. Rather, the effects of collisions should be added in at a later point as a small effect. This is the parameter regime sought.

An example of a difference between the discharge utilized herein and the experiments described in the sources above is the presence of a highly energetic, current controlled, pulsed, beam that can penetrate (or rather, has a good probability of penetrating) through the entire discharge. Due to high breakdown voltages, the more energetic the secondary electron beam emitted at the cathode is, the smaller the probability of collision. The energetic secondary electrons are expected to penetrate past the negative glow region and through the discharge completely causing a charge imbalance that results in a unique plasma response. Further, experiments are not conducted under equilibrium conditions but are based on transient discharge conditions in either single or multi-pulsed mode under conditions where electromagnetic effects dominate diffusion and collision effects.

That is, in combination, Coulomb and self-focusing magnetic field effects of the energetic secondary electron beam play a role in the pinch mechanism. The beam electrons alone are not energetic enough for self-magnetic forces to ensue as the dominant pinch mechanism. Rather, Coulomb repulsion with the thermal electrons and Coulomb attraction with the thermal ions dominates until a force equilibrium results in a quasi-neutral charge balance. The addition of self-magnetic effects generated from present and forth coming energetic beam electrons results in further pinching the electron beam and hence the plasma.

Figure 4:
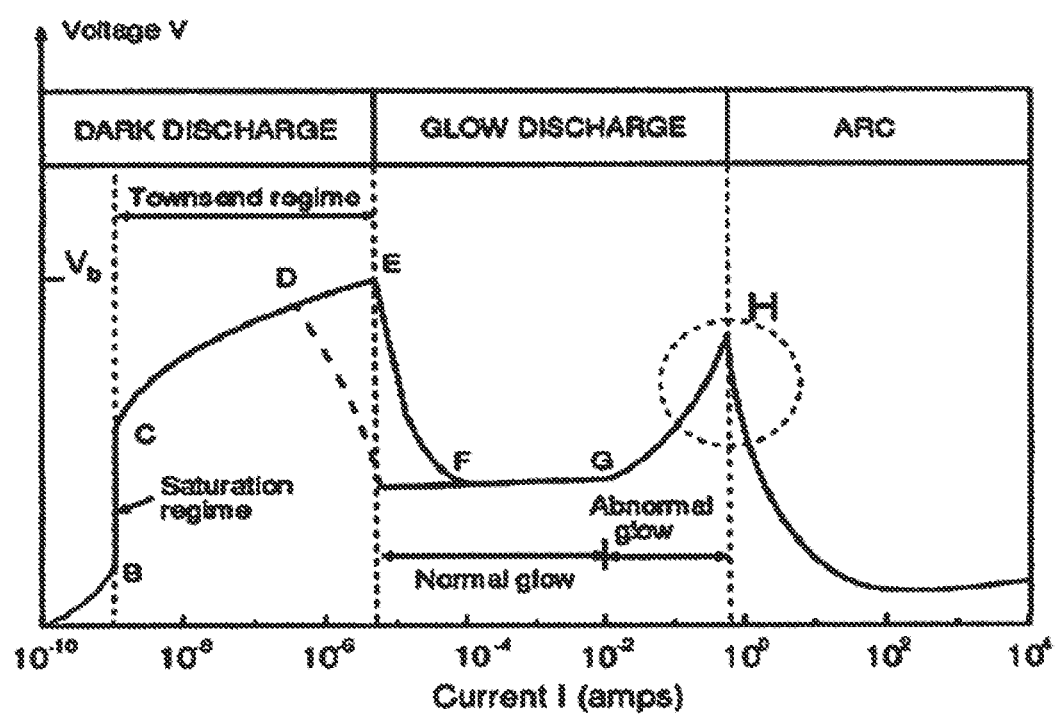
FIG. 4 show voltage-current characteristics of an electrical discharge tube in DC mode.

One danger of increasing pressure and current in order to pinch a glow discharge is the increased possibility of an arc discharge. This phenomenon can be prevented by limiting the current provided by the source (pulsed power system). As shown in the I-V curve FIG. 4, if voltage of the source is held constant and current is allowed to grow without restriction, the glow discharge will eventually transition to an arc. FIG. 4 illustrates voltage-current characteristics of an electrical discharge tube in DC mode.

In summary, a plasma wire (constricted plasma column) can be shaped by changing the state of the discharge tube (e.g., gas pressure, gas type, distance of separation of electrode, electrode geometry, etc.) and the properties of the electrical pulse forming network driving the discharge plasma (e.g., pulse width, repetition rate, discharge voltage, current limit, etc.). The plasma wire containing positive and negative charge continuously being excited, de-excited, ionizing, and recombining resembles a physical solid wire with electrons in the conduction band. In linear thin wire antenna design, the near optimal antenna length is one-quarter of a wavelength of the carrier frequency when appropriately grounded. In an aspect, the distance of separation between the plate electrodes in the discharge tube for near optimal design is also a quarter of a "wavelength." Here, the use of wavelength is broadly used since the pulsed discharge is chromatic. With this in mind, "wavelength" can be an average wavelength of the pulse discharge or can be associated with a well-defined frequency with modulation driving the mixer (opto-electronic switch). Although less efficient, antennas also operate properly in the so called infinitesimal dipole limit such as capacitor plate (also referred to as top-hat-loaded) antennas. In such a case, the distance of separation between the parallel plate electrodes is equal to or smaller than typically $\frac{1}{50}$ of a wavelength. The solid essence of the wire antenna (binding energies of the atoms and/or molecules of the solid) maintains the shape of the wire under normal conditions. This is not the case for the plasma wire. Changing the discharge current results in a different cylindrical radius of the constricted plasma column (plasma wire). Consequently, a significant portion of the pulsed current delivered to the plasma discharge must not be modulated in order to maintain the shape desired of the plasma wire. Further, this current also drives the white light noise desired to mask the communication signal. Here, white light noise implies thermal noise over a broad band of frequencies including the carrier frequency with sideband. The sideband is the band of frequencies above and below the carrier frequency associated with the power of the modulated signal or, equivalently, the communication signal. The fraction of current that is modulated is chosen such that the plasma wire structure only exhibits slight perturbation about an average radius. Further, since the fraction of the current to carry the communication signal is small, the strength of the radiated communication signal will be low compared to the overall radiated white light noise signal. A balance between the perturbation of wire geometry and communication signal strength can be attained in order for there to be enough energy in the transmitted signal a distance from the source to be resolved with a narrow pass band filter. The carrier frequency can be chosen for line-of-sight communication or global communication. This allows for camouflage communication to be transmitted to short or long distances as desired subject to the frequency dependent attenuation properties of the atmosphere and the radiated output power of the discharge.

DC discharge, electrical arcing, lightning, and other processes both natural and man-made results in some sort of directed glow along an irregular column in space. This light is a consequence of recombination or de-excitation processes which are typically a by-product of a plasma glow discharge. In experiments and in nature, the center of the irregular column appears to be more luminous as compared to other parts of the column. This tends to imply that the central portion of the column has a larger plasma density or ionized discharge gas density. Or, it could mean that the number density is constant and the comparative regions are of different volume. The larger volume region would contain more recombination events and hence be more luminous. Further, the column appears to be stable over the time duration of the phenomena. This may imply that high currents generating magnetic fields tend to apply a magnetic pressure on the discharge thereby in part containing the discharge. It is not difficult to demonstrate that internal space charge effects tend to dominate over magnetic pressure effects in an isolated charged fluid of single charged specie moving with uniform drift velocity such as, for example, and energetic electron beam. If on the other hand, the energetic beam of electrons immersed in a plasma repels the cool thermal electron gas without significantly being affected by space charge effects, then the interpenetrating background ions will through Coulomb effects tend to counteract the internal space charge effects of the single charge species beam. Force balance among space charge effects will be achieved. This allows for the weak self-magnetic field from the beam to pinch the beam electrons and stabilize the pinch as long as the supply of energetic beam electrons is not degraded. Although not complete, this mechanism is commonly called electron channeling.

The propagation of charged beams transported through neutral gas or plasma has been studied in detail by many researchers. Often, the charged beam will propagate through the gas or plasma in a pinched mode instead of breaking up as one would expect from like-charge Coulomb driven particles. A common theory used to explain this phenomenon is such: When an electron beam enters a gas (or plasma) it, in part, ionizes this gas generating localized thermal electrons and ions. A continuous supply of beam electrons with sufficient momentum in a particular direction continuously expels the excess thermal electrons by Coulomb repulsion leaving the hard to move thermal ions in place. The thermal ions, in the absence of the thermal electrons, neutralizes the beam's space charge yielding an equilibrium condition. Small self-magnetic forces become significant. The electron beam can then constrict and propagate due its own magnetic forces; no external magnets are needed.

Since glow discharges under certain conditions show pinched propagation from cathode to anode, the mechanism described above may be the best explanation for this pinched mode.

In an aspect, provided is an electron expulsion and electron channeling model. For the purposes of this disclosure, it is assumed:

The beam electrons are so energetic that the divergence of the electron beam due to space charge effects in the plasma medium are negligible over the duration of the experiment within the overall length of the plasma discharge;

The electron beam of radius 'a' is cold and drifts with nearly constant velocity along the length of the plasma medium symmetrically located about the z-axis drifting in the plus z-direction;

Thermal effects among the cool thermal electrons and ions are neglected yet the multiple gas species has enough "thermal energy" to minimize recombination over the time of the experiment;

The thermal ions are nearly stationary;

Further, the injected electron beam is a continuous source of energetic charge. The governing relations for the jth species are $$\frac{\partial n_j}{\partial t} + \vec{\nabla} \cdot [n_j \vec{v}_j] = 0 \quad (2)$$

$$m_j n_j \frac{d\vec{v}_j}{dt} = n_j q_j E_r \hat{r} \quad (3)$$

$$\oiint_S \vec{E} \varepsilon_v \cdot d\vec{S} = \iiint_V [q_b n_b + q_i n_i + q_e n_e(\vec{r}, t)] d\mathcal{V} \quad (4)$$

where, independently, j=b, i, and e representing the beam electron fluid, cool thermal ion fluid, and the cool electron fluid respectively; E is the resultant electric field in vacuum with permittivity of free space, $\in_o$. Here, $m_j$, $n_j$, $q_j$ and $\vec{v}_j$ are respectively the mass, number density, the charge, and average fluid velocity of the jth species. The following normalized definitions have been applied for time $\tilde{t}=\omega_{pe}t$, background electron density $\tilde{n}_e(\tilde{t})=n_e(t)/n_{eo}$, background ion density $\tilde{n}_i=n_i/n_{eo}$, electron beam density $\tilde{n}_b=n_b/n_{eo}$, beam current $\tilde{I}=I[e\pi a^2 n_{eo} c]^{-1}$, voltage $\tilde{V}=eV[m_e c^2]^{-1}$, axial length $\tilde{l}=l\omega_{pe}/c$, velocity $\tilde{v}=v/c$, cylindrical radius $\tilde{r}=r/a$, and force $\tilde{F}=F[am_e\omega_{pe}^2]^{-1}$, Where $\omega_{pe}=[e^2 n_{eo}/\in_o m_e]^{1/2}$ is the electron plasma frequency, a is the initial radius of the electron beam, c is the speed of light, $m_e$ is the mass of an electron, –e is the charge of an electron, and $\in_o$ is the permittivity of free space. For a uniformly distributed electron density, the continuity for the thermal electrons given by Eq. (2) along with Eqs. (4) and (5) characterizing the field from a uniform cylindrical charge distribution yields the internally self-consistent relation for the normalized thermal electron number density $$\frac{d\tilde{n}_e(\tilde{t})}{d\tilde{t}} + \sqrt{2}\,[\tilde{n}_e(\tilde{t}) - \tilde{n}_i + \tilde{n}_b]^{1/2} \tilde{n}_e(\tilde{t}) = 0 \quad (5)$$

At this point it should be considered that the initial conditions and the expected equilibrium use physical qualitative arguments. This way, the various solutions can be compared to what is expected. Before the beam is introduced, due to quasi-neutrality, the background electron density should equal the background ion density. As t approaches infinity, the background electron density will decrease to zero if the ion density is lower than the beam density. This is because the imbalance in charge density can never be equalized and the electric force will continue to eject electrons until none are left. As t approaches infinity when the ion density is greater than the beam density, the background electron density will decrease to the difference between the ion density and the beam density. This is because as soon as this point is reached, the charge imbalance in the system will no longer exist and the electric force will equal zero. These results are summarized in Table 1 below.

TABLE 1

Initial and final conditions of the background electron density

|  | $n_b \geq n_i$ | $n_b \leq n_i$ |
|---|---|---|
| t = 0 | $n_e = n_i$ | $n_e = n_i$ |
| t → ∞ | $n_e \to 0$ | $n_e \to n_i - n_b$ |

As background thermal electrons are expelled from the electron beam region, the background ions generate a focusing Coulomb force that partially or totally compensates the beam's repulsive space charge force. The ion space charge force when added to the beam's self-space charge and self-magnetic force results in beam expansion or contraction depending on the relative magnitudes of the competing forces. Summing the Coulomb and magnetic space charge forces acting on the beam electrons assuming the beam is non-relativistic gives $$\vec{F}_r(\tilde{t}, \tilde{r}) = \frac{\tilde{r}}{2}[\tilde{n}_b(1 - \tilde{u}_b^2) + \tilde{n}_e(t) - \tilde{n}_i]\hat{r} \quad (6)$$

The following four cases are considered: Case 1

$$\tilde{n}_b = \tilde{n}_i, \text{ Case } 2\tilde{n}_b > \tilde{n}_i \frac{\tilde{n}_e(t)}{\tilde{n}_b - \tilde{n}_i} \ll 1, \text{ Case } 3\tilde{n}_i - 0.5\tilde{n}_e(t) \gg \tilde{n}_b,,$$

and Case 4 $\tilde{n}_i \geq \tilde{n}_e(\tilde{t}) > 0$ with $\tilde{n}_b > \tilde{n}_i$. With the aid of Eqs. (5) and (6), an analytic solution for the normalized pinch time of Case 1, Case 2, and Case 3 can be derive yielding, respectively, $$\tilde{T}_{pinch} = \sqrt{\frac{1}{\tilde{n}_i \tilde{V}}} - \sqrt{2} \text{ valid for } \tilde{n}_b = \tilde{n}_i \quad (7)$$

$$\tilde{T}_{pinch} = \quad (8)$$

$$\frac{-1}{\sqrt{2(\tilde{n}_b - \tilde{n}_i)}} \ln\left[\frac{(\tilde{n}_i - \tilde{n}_b[1 - 2\tilde{V}])(2\tilde{n}_b - 2\tilde{n}_i + 1)}{(1 + 2\tilde{V})\tilde{n}_b - \tilde{n}_i}\right] \text{ valid for } \tilde{n}_b \gg 1$$

$$\tilde{T}_{pinch} = \frac{\tilde{n}_b - \tilde{n}_i - \sqrt{2(\tilde{n}_b + 1 - \tilde{n}_i)(\tilde{n}_b \tilde{V})}}{(\tilde{n}_i - \tilde{n}_b)\sqrt{\tilde{n}_b \tilde{V}}} + \quad (9)$$

$$\left[\frac{(\tilde{n}_i - \tilde{n}_b)^2 + 4(\tilde{n}_i - \tilde{n}_b)\sqrt{2(\tilde{n}_b + 1 - \tilde{n}_i)(\tilde{n}_b \tilde{V})} +}{(6\tilde{n}_b - 6\tilde{n}_i + 2)\tilde{n}_b \tilde{V}}\right]^{1/2}$$
$$\frac{}{(\tilde{n}_i - \tilde{n}_b)\sqrt{\tilde{n}_b \tilde{V}}}$$

valid for $\tilde{n}_b < 1$

Case 4 provides a better fit when determining $\tilde{T}_{pinch}$ in the parameter region as $\tilde{n}_b \tilde{t}^+$, However, because of the complexity of the solution of Case 4, $\tilde{T}_{pinch}$ is solved numerically in brute force fashion.

Figure 5:
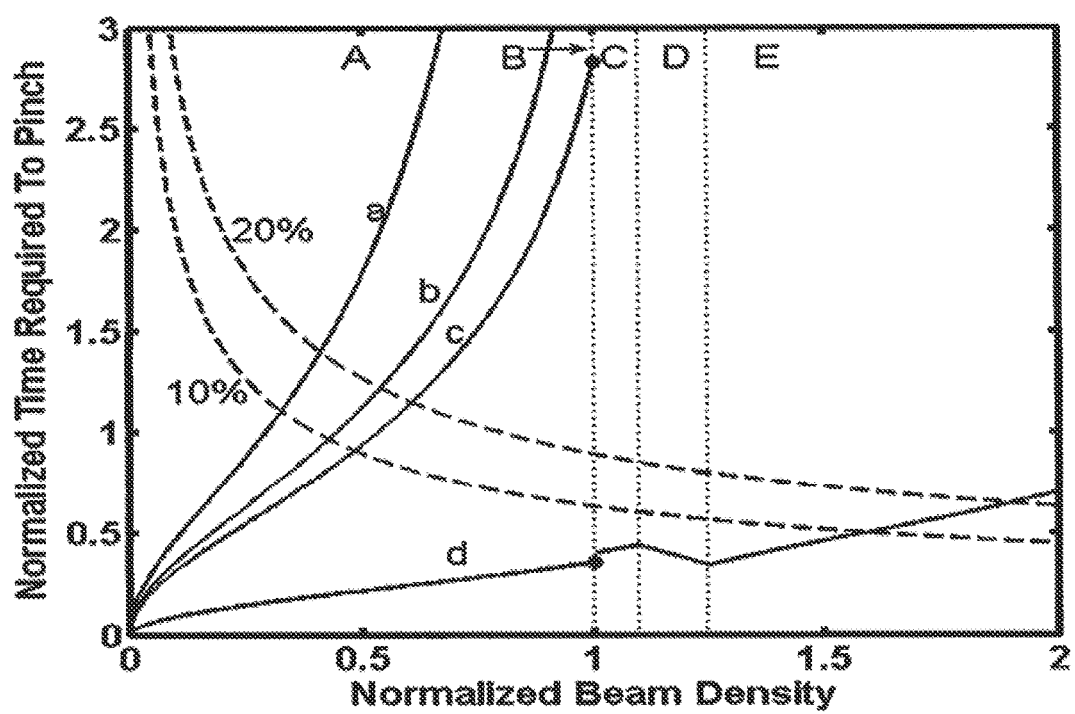
FIG. 5 shows normalized time required for the beam to achieve equilibrium and transition from expansion to contraction. Solid lines a, b, c, and d correspond to the normalized beam energies $\tilde{V}=0.001$, $\tilde{V}=0.032$, $\tilde{V}=0.0556$, and $\tilde{V}=0.32$ consecutively. Region A, B (case 1 region), C, D, and E are denoted by dotted vertical lines and represent the various partitions of the parameter space where different solutions are valid. Region A corresponds to Case 3, Region B to Case 1, Region C to Case 4, and Region E to Case 2. Free expansion times at 10% expansion and 20% expansion are represented by the dashed lines. The intersection between each solution (curves a-b) and the 10% expansion line gives the limit for the validity of this method.

FIG. 5 displays the normalized time required for the beam to achieve equilibrium and transition from expansion to contraction. Solid lines a, b, c, and d correspond to the normalized beam energies $\tilde{V}=0.001$, $\tilde{V}=0.032$, $\tilde{V}=0.0556$, and $\tilde{V}=0.32$, consecutively. Region A, B (case 1 region), C, D, and E are denoted by dotted vertical lines are represent the various partitions of the parameter space where different solutions are valid. Region A corresponds to Case 3, Region B to Case 1, Region C to Case 4, and Region E to Case 2. Free expansion times at 10% expansion and 20% expansion are represented by the dashed lines. The intersection between each solution (curves a-b) and the 10% expansion line gives the limit for the validity of this method.

FIG. 5 depicts the normalized pinch time $\tilde{T}_{pinch}$ over the entire normalized beam density $\tilde{n}_b$ parameter space bounded by the free expansion time $\tilde{T}_{fe}$ (time it takes for the beam to expand radially from rest due only to beam space charge effects) of the electron beam (dashed curve). The plot is divided into 5 discrete regions labeled as A, B, C, D, and E.

As stated in the caption, each region is identified to a special case except region D. In region D, the approximate solutions from either extremes yield an error that exceeds 10%. In this region, one therefore interpolates between the endpoints of region C and E to obtain a reasonable pinch time since the approximation in regions C (Case 4b) and E (Case 2) respectively overestimates and underestimates the background electron density as shown in FIG. 5

The pinch time was plotted for four normalized voltages (and corresponding beam or discharge voltages): a) $\tilde{V}$=0.001 (511 V), b) $\tilde{V}$=0.032 (16.38 kV), c) $\tilde{V}$=0.0556 (28.5 kV), and d) $\tilde{V}$=0.32 (163.8 kV). Because a classical theory was applied, line d is the limiting maximum normalized voltage for the validity of the theory. Line a corresponds to a beam (discharge) voltage of about 500 V. So, the region bounded by the free expansion time curve (dashed line) and lines a and d gives rise to the parameter space where the nearly uniform cylindrical beam approximation is valid. Further, the beam will exhibit pinch because of the combination of electron channeling and self-magnetic focusing mechanisms. Typically, a glow discharge voltage will fall between curves a and b (500V and 16 KV). For a particular beam voltage (glow discharge voltage), as the beam density increases relative to the plasma density, the beam takes longer to pinch assuming the pinch time is less than the free expansion time. It is also observed that as the beam approaches a relativistic condition, the normalized beam density can exceed one implying that magnetic focusing effects is significant.

In an aspect, the glow discharge will constrict under certain operating conditions. A DC discharge tube was constructed that is essentially a parallel plate capacitor placed within a vacuum chamber. The setup of the electrical discharge tube is shown in FIG. 6A and FIG. 6B.

Figure 6A:
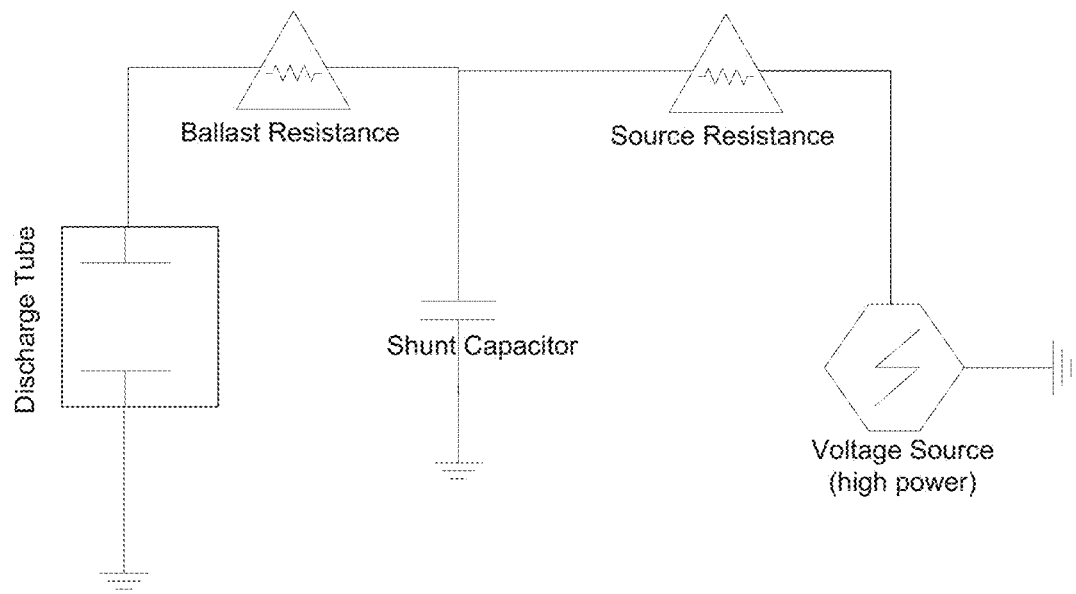
FIG. 6a, b shows electrical discharge tube experimental setup. Two different vantage points are shown with labels identifying important features.
Figure 6B:
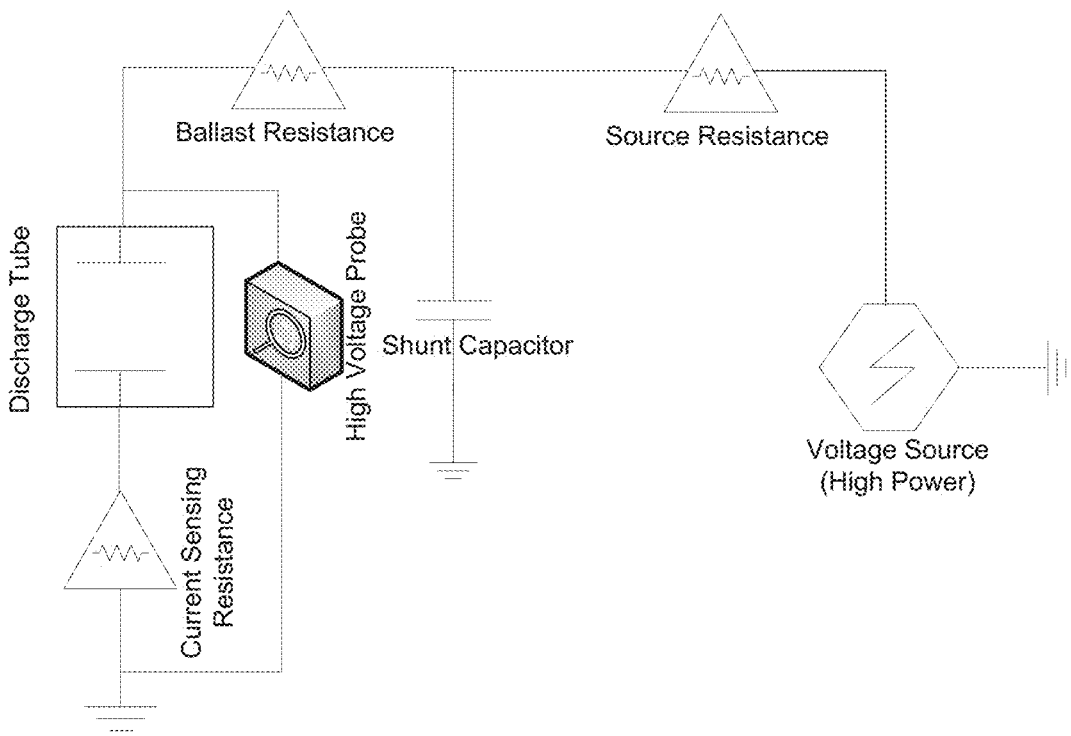

FIG. 6A and FIG. 6B show an electrical discharge tube setup. Two different vantage points are shown, with labels identifying various features. These figures depict the electrical setup for the pulsed glow mode, which will be explained in detail later. The following paragraphs along with FIG. 6A and FIG. 6B provide a summary of the setup.

The following components are all labeled in FIG. 6B. A high power supply (which is to the right and not fully pictured, but is labeled in FIG. 6B) connects to the source resistance, which is connected to a shunt capacitor. This capacitor also connects to a ballast resistance, which in turn leads to the parallel plate discharge tube. Finally, the vacuum gauge is also labeled in the figure, which displays the pressure of the discharge tube.

In FIG. 6A, the left side pictures the electrical diagnostics, including a high voltage probe, current sensing resistor, and an oscilloscope (the oscilloscope is outside of the picture view, but is labeled with an arrow pointing to the left edge of the photograph). On the right side of FIG. 6A the discharge tube is pictured along with the plastic vacuum tubing that leads to the vacuum pump. The vacuum pump is not pictured. Finally, the camera and optical stand are labeled. The camera can also be mounted above the discharge tube on a bench mount that points downwards. This mount is not pictured.

A Plexiglas cylindrical tube (OD 8") was placed between two Lexan® polymer square plates and bolted together with rubber Viton sheets at both connections to provide a vacuum seal. All threaded lamp pipe kit brass tubes protrude from both Lexan ends into the chamber with aluminum plates attached to the inner end of the tubes. These circular plates face each other forming a parallel plate capacitor. They are both 4" in diameter, ⅛" thick and constructed from 6061 aluminum alloy (98% pure aluminum) and have been placed 1.18" (3 cm) apart. The brass tubes are connected to external vacuum components as well as external electrical circuitry. This allows for control of the chamber pressure. It also allows a voltage to be placed across the parallel plates. If this voltage exceeds a certain value (the breakdown voltage dictated by the Paschen curve) then breakdown will occur and plasma will be produced between the plates. This plasma will be either a glow discharge or an arc discharge.

Figure 7:
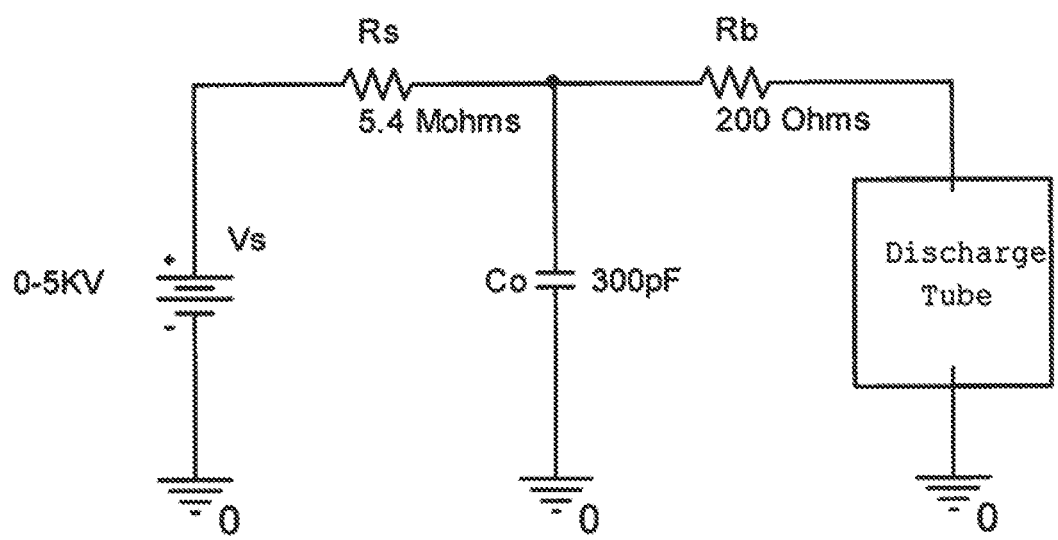
FIG. 7 shows external electrical system design for the pulsed glow discharge system. Actual values change depending on experiment.

The tube can be operated in two different modes depending on the external circuitry. One mode is a pulsed glow mode, as shown in FIG. 7. In this mode, high voltage pulses are applied to the aluminum plates, which lead to a pulsed breakdown across the plates. Pulses with a peak voltage of 5 kV and a peak current draw of 5 A have been observed in the discharge. This amount of current and power is not sustainable at DC, but is very stable in an appropriate pulsed mode circuit configuration. This system allows high voltage and high current operation without arcing.

The system operates by using a high voltage power supply to slowly feed a capacitor bank with current, which slowly increases the capacitor bank voltage. This capacitor bank is connected to the discharge tube and when it reaches the dielectric strength of the gas in the tube (this voltage depends on the pressure and distance of separation according to the Paschen curve) breakdown occurs, plasma is formed between the plates, and current begins to flow through the system quickly. The voltage across the plates drops quickly once breakdown occurs which causes the capacitor bank to release its excess charge. The current is slowed by a ballast resistor placed between the capacitor and discharge tube. Once the capacitor bank reaches the voltage of the tube, no more current can be conducted and the glow discharge is extinguished. The capacitor bank is then slowly fed until it reaches the breakdown voltage again, and the process repeats. By changing the source resistance ($R_s$) and source voltage ($V_s$), the repetition rate can be controlled. By changing the capacitance ($C_0$) and ballast resistance ($R_b$), the pulse length can be controlled. By changing the ballast resistance (Rb), the peak current of the pulse can be controlled.

Figure 8:
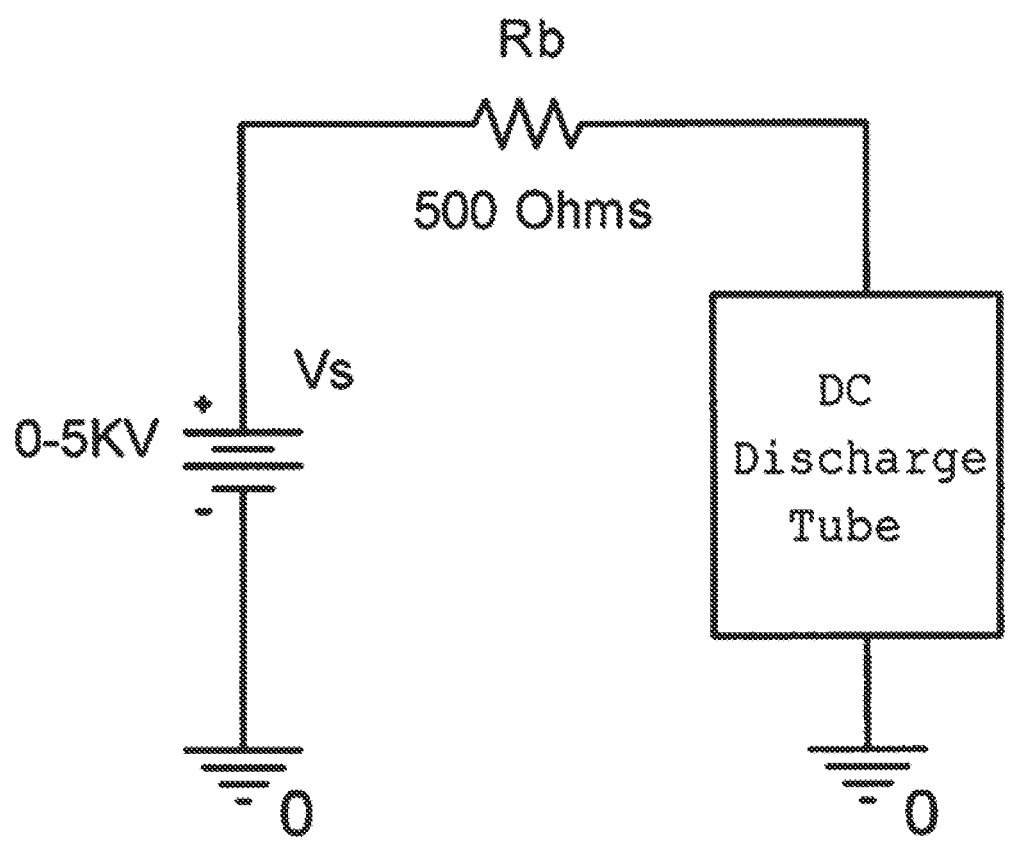
FIG. 8 shows DC discharge electrical schematic. Actual values change depending on experiment.

The other mode that the discharge tube can be operated in is a purely DC mode, as illustrated in FIG. 8. The high voltage power supply is connected directly to the discharge tube and the DC voltage breaks down the air between the plates and a DC glow discharge is established. The current is then controlled by the ballast resistance and power supply voltage.

As described herein, as pressure and current are increased the risk of an arc occurring is increased. In order to observe the intense pinched column in the glow discharge the tube can be operated at high currents and high pressures (relative to many glow discharges). These high currents and pressures can lead to arcs and streamers when the tube is operated in DC mode. This can prevent the observation of the intense pinched glow discharge. Also, at these high powers the DC discharge tube heats up tremendously and there can be a significant risk of damaging the system.

In pulsed mode very high currents can be achieved (>1 A) at very high pressures (>5 Torr) without arcing. Under these operating conditions a very intense pinched column is observed. This column is not an arc and does not cause cathode damage that is visible to the eye.

Figure 9:
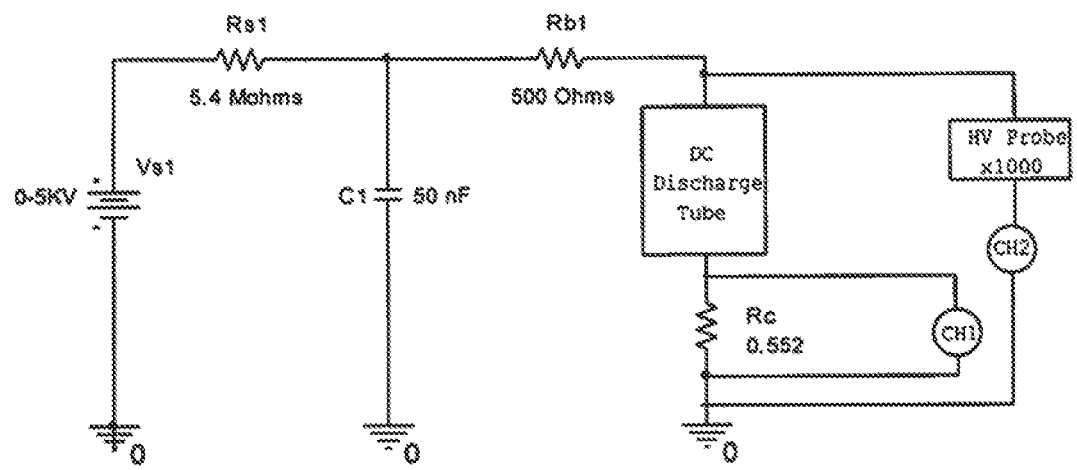
FIG. 9 shows a schematic of external electrical system including voltage and current probes.
Figure 10:
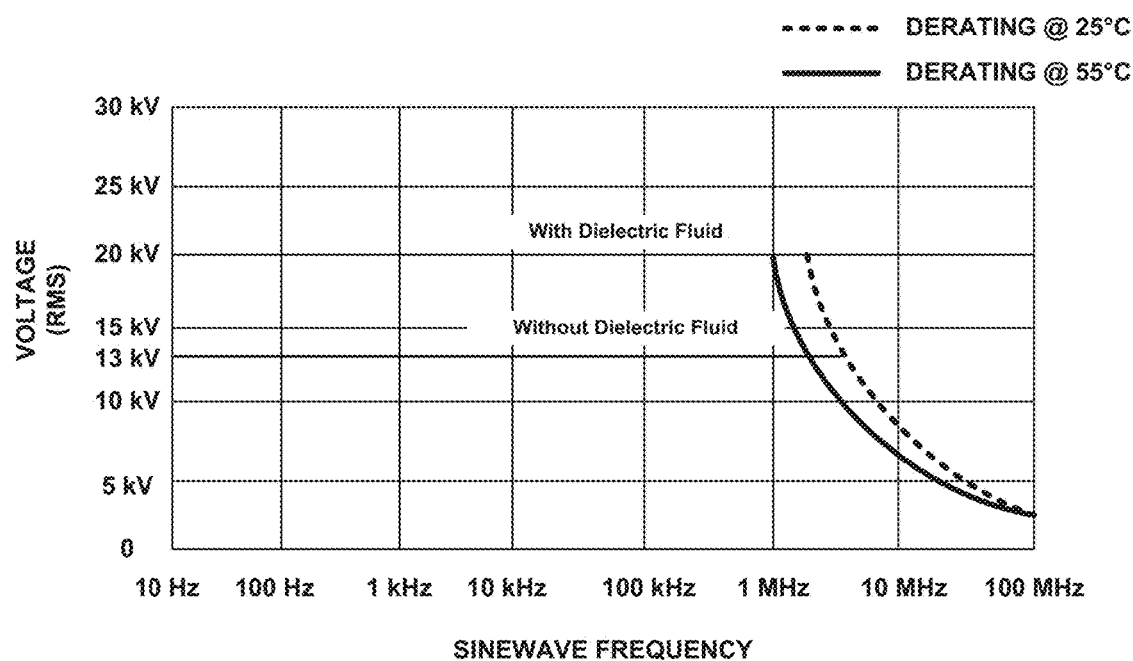
FIG. 10 shows maximum input voltage derating versus frequency. Found in Tektronix P6015 datasheet.

The voltage and current of the glow discharge can be measured by external probes as shown in FIG. 9. The voltage is measured by a 1000×1 HV probe (Tektronix P6015). This probe is valid for rise times greater or equal to 4.5 ns. FIG. 10 and FIG. 11 provide technical specifications.

The current can be measured by a series resistor placed between the discharge tube and ground. This shunt resistor has a resistance of 1.752Ω and an inductance that was too low to measure with the LCR meter in the lab. Thus, it can measure quick changes in current.

The plasma glow can be examined using a digital camera, for example, a digital camera with a 30 frames per second frame rate. As the electrons and ions in the glow discharge recombine and de-excite, they will emit light. It is assumed that the light intensity will be proportional to the plasma density since twice as many particles will emit twice as many photons. If a line is drawn from the cathode to the anode, then the camera is pointed perpendicular to this line. Each pulse is captured by one frame and the frames are then separated, for example using a video editing program such as Corel Video Studio Pro X4. Since the frames are spaced 33 ms apart and the pulses last for less than 1 ms, the cameras might not capture any time resolution of the glow. Instead, as the shutter opens it gathers a time averaged image of the pinch. It is assumed that the equilibrium pinch is established very quickly so that the time averaged pinch seen in the frames is a good representation of the equilibrium pinch. The frames can then be processed, for example using Matlab, to determine the equilibrium spatial characteristics of the pinch. See FIG. 12A and FIG. 12B for an example of a captured frame and an example of the equilibrium pinch.

Figure 12A:
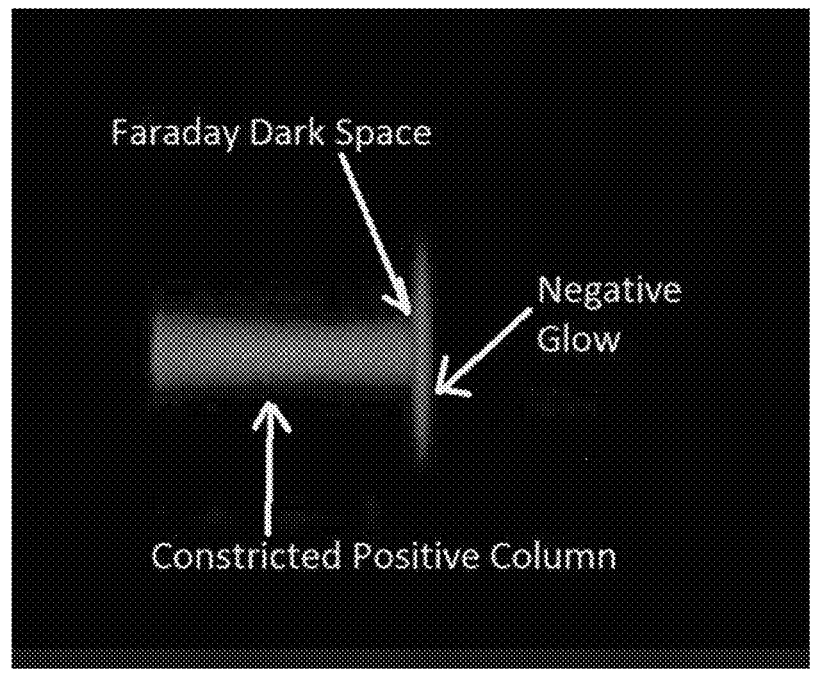
FIG. 12a, b shows a frame extracted from a single glow discharge pulse at pressure 10 Torr, Io=1.1 A, and 300 pF capacitance, (a) Shows the common shape of the constricted glow including the various regions, (b) Shows the plate positions when the glow is off and flashlight is shined on them. As seen from (b) the cathode is on the right and the anode is on the left in both pictures.
Figure 12B:
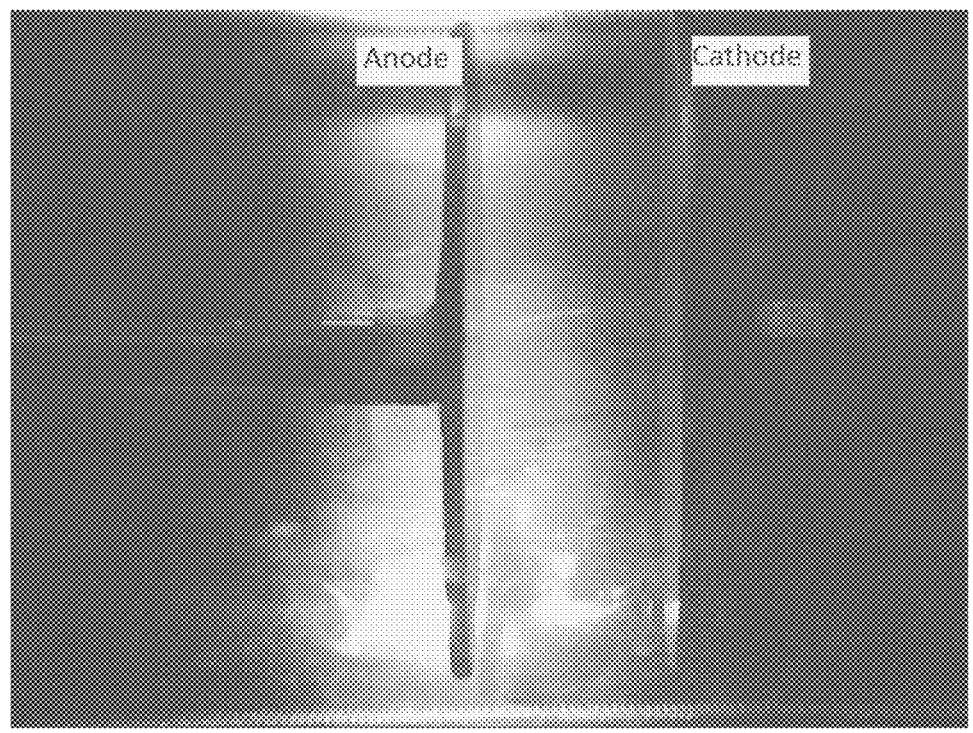

FIG. 12A and FIG. 12B display a frame extracted from a single glow discharge pulse at pressure 10 Torr, Io=1.1 A, and 300 pF capacitance. FIG. 12A shows the common shape of the constricted glow including the various regions. FIG. 12B shows the plate positions when the glow is off and flashlight is shined on them. As seen from FIG. 12B the cathode is on the right and the anode is on the left in both pictures.

Table 2 gives a list of the various components mentioned above as well as a description of each component.

TABLE 2

List of experimental components and specifications.

| Component | Description |
| --- | --- |
| Aluminum Plates | Alloy 6061 (98% aluminum), 4" Diameter, 1/8" Thick, 1 3/16" separation between plates |
| Chamber Walls | Plexiglas cylinder, 8" OD Two square Lexan end plates 1 cm thick |
| Capacitor Bank | Composed of ~5 nF capacitors linked in parallel, number of capacitors controls total capacitance |
| Ballast Resistors | High Power Ohmite resistors, series L225j 225 W continuous, 2,250 W peak and 2 W ceramic resistors. |
| HV Probe | Tektronix P6015, Bandwidth 75 MHz, Valid for rise time >4.5 ns |
| Current Sensor | 1.752 Ω, low inductance shunt resistor |
| Oscilloscope | Tektronix TDS 784C, 1 GHz, 4GSa/s, IMa or 50 a channels, 4 channels total |
| Power Supply | Gamma model #RR5 200R, 0-5 KV, 0-2 A continuous |
| Vacuum Pump | Agilent Triscroll 300 Inverter Dry Scroll Pump |
| Neutral Gas | Las Vegas air. |
| Vacuum Connectors | Swagelok Ultra-Torr series |
| Vacuum Sensor | Varian PCG-750 |
| Secondary Camera | Fujifilm Finepix ™ S2000HD, 10 Mpxls, 27 mm, 30 frames/sec, |
| Main Camera | Fujifilm Finepix ™ S2950, 14 Mpxls, 28 mm, 30 frames/sec |

A stable pinch can be created in a glow discharge at high pressures (above 5 Torr) if a pulsed system is employed which inherently limits the current characteristics. Under DC conditions, the glow destabilizes into damaging arcs, and the desired pinch is not observed. When the pulsed system is initiated at pressures above 5 Torr, a constricted glowing column is observed between the plates. This column wanders around the cathode, sometimes resting upon a spot on the cathode for a long period of time. If the pressure is decreased below 5 Torr, the column disperses and the glow covers nearly the entire plate.

Figure 13:
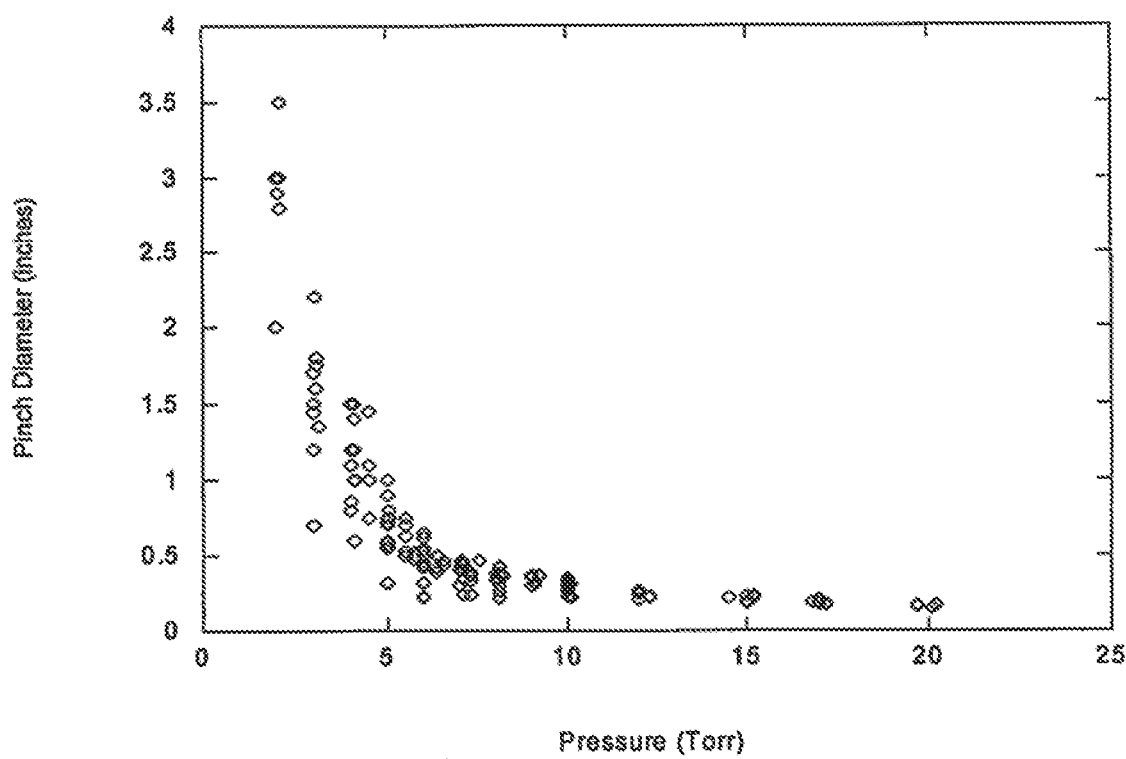
FIG. 13 shows a pinch diameter versus pressure for all data points with repetition rates between 100 and 1000 Hz. Peak currents range from 46 mA to 3,196 mA. Pulse width varies from 1.5 µs to 15 µs.

There is an asymptotic behavior of pinch diameter with pressure. At low pressures between 1-3 Torr, the glow discharge nearly fills the entire area of the plates. As the pressure is increased to 4 or 5 Torr, the glow area begins to quickly form a column and the radius decreases greatly. At 6 Torr, and a diameter of half an inch, the column reaches a point where it pinches further with increasing pressure, but it does so slowly. From 6 Torr up to 20 Torr, the diameter decreases slowly from 0.5" to 0.2". The effect of pressure on pinch diameter is shown in FIG. 13 where every data point is plotted. As the pressure increases, due to the Paschen effect the breakdown voltage increases. As the breakdown voltage increases, the charge build-up increases. As the charge build-up increases, the initial discharge current increases yielding the pinch effect as suggested by the mechanism presented and theoretically explored.

Figure 14:
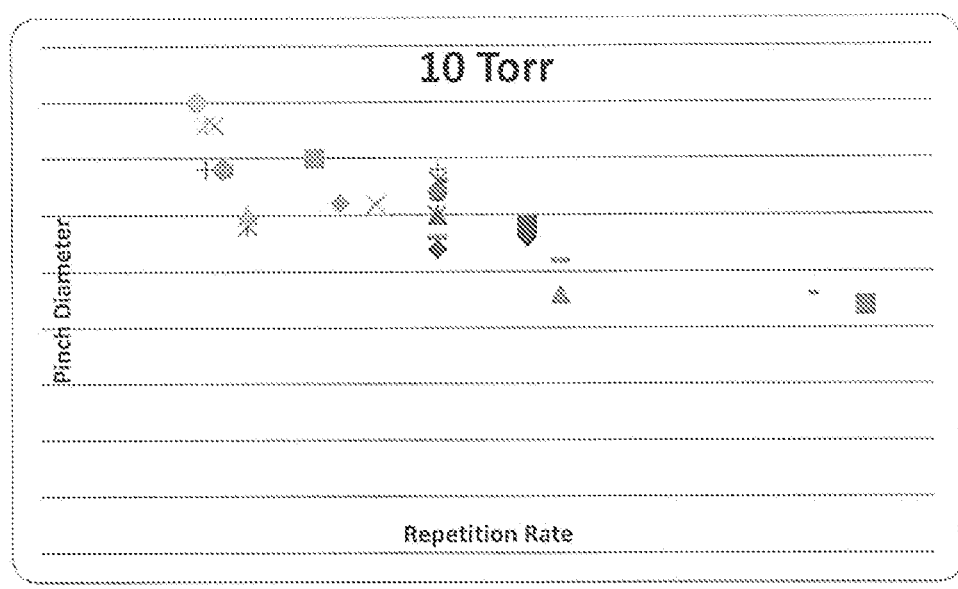
FIG. 14 shows a pinch diameter as a function of repetition rate at 10 Torr. Peak current and pulse width vary.

The spread in diameter at the high pressures (after pinch formation) is due to changes in repetition rate. When only data points between 100 Hz and 1000 Hz are plotted, this variation decreases at high pressures as seen in FIG. 14. The variance in measured diameter at the lower pressures is probably due to a low signal to noise ratio. When the glow is diffuse and covers a large area of the cathode, the light is very dim and the image processing code becomes less reliable.

As for changing the peak current at the source, increasing it does increase the peak light intensity, but it has no effect upon the plasma column radius. This is not surprising nor is it a contradiction of claims. The source supplies charge to the capacitor bank that drives the pinch. The breakdown voltage does not change since the pressure is the same. Therefore, the capacitor releases the same amount of charge in nearly the same manner current limited by the same ballast resistor. The source current contribution to the discharge is orders of magnitude small compared to that of the bank upon discharge. Therefore, the pinch radius will not change with nearly identical discharges. The light intensity does increase because the capacitor bank is charge up faster and hence the frequency of the discharge has increased as perceived by one's eyes.

Figure 15:
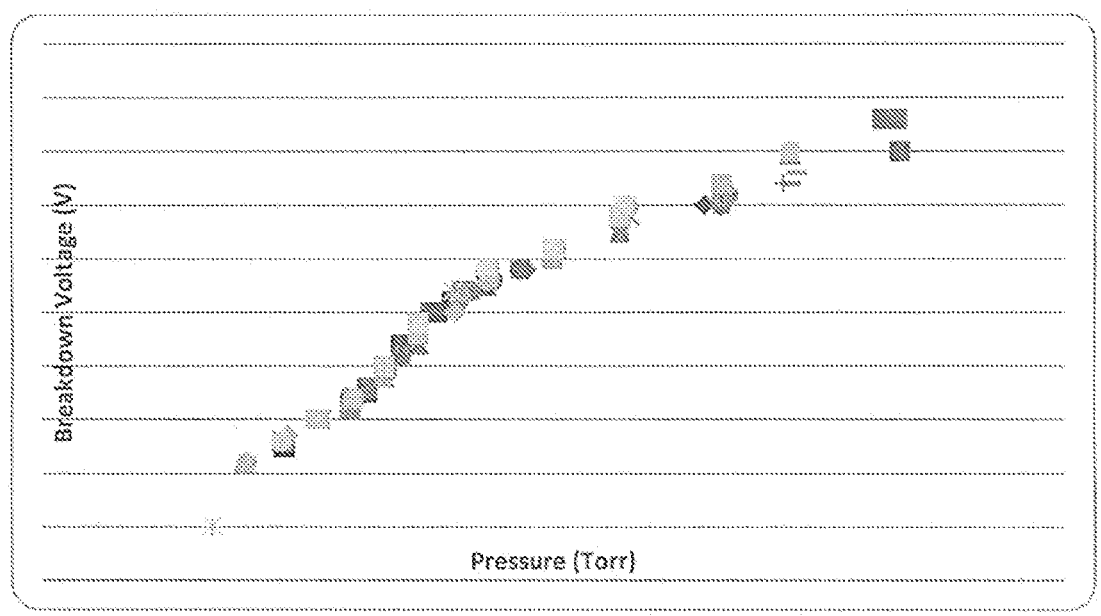
FIG. 15 shows a measured breakdown voltage with plate separation equal to 3 cm.

The breakdown voltage was measured and plotted as a function of pressure. FIG. 15 indicates measured breakdown voltage with plate separation equal to 3 cm. As can be seen in FIG. 15, the system is operating on the right side of the Paschen curve. Here, the plate separation is 3 cm. This is important because as pressure increases, so does the breakdown voltage. As a note, the measured breakdown voltage was compared to published breakdown voltages and was found to be 8% higher. This could be due to a number of possible factors, such as a slight change in gas composition, humidity or temperature. The error is not significant.

The presently disclosed system creates pulses of stable constricted plasma in the form of a glow discharge. Many characteristics of the discharge can be controlled, including pressure, pulse rate, pulse width, and peak current. These stable plasma flows can be used to transmit camouflaged signals.

In an aspect, the methods, systems, and apparatuses provided herein can camouflage a communication signal with a specific property in a sea of natural noise over a broad spectrum. Given some information of the specific property, the transmitted communication signal can be recovered from the noise at the reception end. Under appropriate conditions, it is anticipated that the noise with signal may be varied such that in select regions in space the noise signature may be viewed as slightly elevated background noise. Consequently, one's attention is not drawn towards the transmission and reception devices. Further, a large number of transmission patterns may be generated allowing for ease in cloaking the signal. Such device may be used on the battlefield, in sensitive locations where high technology eaves droppings is of concern, as a means to communicate with unmanned aircraft systems, and to cloak satellite communication for government and commercial purposes.

It is noted that typical rf and DC discharge devices including fluorescent light bulbs operate at pressures below 5 Torr. For many plasma processes the pressure levels in the mTorr to 10 s mTorr on the low pressure side of the Paschen curve. The Paschen curve is an empirical study of the arc/glow discharge breakdown voltage versus the product of the operating pressure and electrode separation (typically parallel plate separation). On the low pressure side of the Paschen curve for a constant pressure and breakdown voltage, arc or glow discharge is more prominent when the distance of separation between parallel plate electrodes are larger than that associated with the operating point of the curve. This is because collisions are more favored at larger mean free paths. On the high pressure side of the Paschen curve for a constant pressure and breakdown voltage, arc or glow discharge is more prominent when the distance of the separation between parallel plate electrodes is smaller than that associated with the operating point of the curve. This is a consequence that the gas density is so high that ionized charges do not have the ability to increase in energy due to high probability of collision to ignite a collision cascade or avalanche leading to a discharge.

In an aspect, an element of the transmitting device is a naturally constricted plasma wire generated by pulsed power techniques at mid pressures being modulated with a linear switch operating in a high voltage and high current transient mode. When operating on the high pressure side of the Paschen curve at mid pressures, the discharge voltage increases with increase in pressure. At the higher voltages, the secondary electrons emitted from the cathode electrode due to ion bombardment gain enough energy in the cathode sheath region that the probability of collision in the discharge (plasma region) is small compared to that at lower pressures. The discharge gas can then be treated as four interpenetrating fluids, an electron beam (secondary electron) fluid, a thermal electron fluid, a thermal ion fluid, and a neutral gas fluid. Secondary electrons are continuously being generated such that the electron beam has a continuous supply of high energy electrons. As these electrons continuously replace other succeeding beam electrons, the Coulomb force acting on the thermal electrons displaces the thermal electrons typically in the radial direction. Assuming the interpenetrating heavy thermal ions exhibit no motion in the absence of the thermal electron, the thermal ions attract the beam electrons thereby neutralizing the space charge forces among beam electrons. Further, space charge effects among thermal ions are also neutralized. This characteristic gives rise to electron beam channeling as space charge equilibrium is created. Because the electron beam is energetic, it also generates a self-magnetic field which further pinches the electron beam. These two effects working in concert with each other give rise to the constricted pinch.

Based on a very simplistic model at pressures less than 5 Torr, one can show that the probability of collision is so favorable that the majority of beam electrons will have lost well over 50% of their initial energy by the time they have passed through the discharge. As a result, the discharge tends to spread across the entire surface area of the electrodes.

Figure 16:
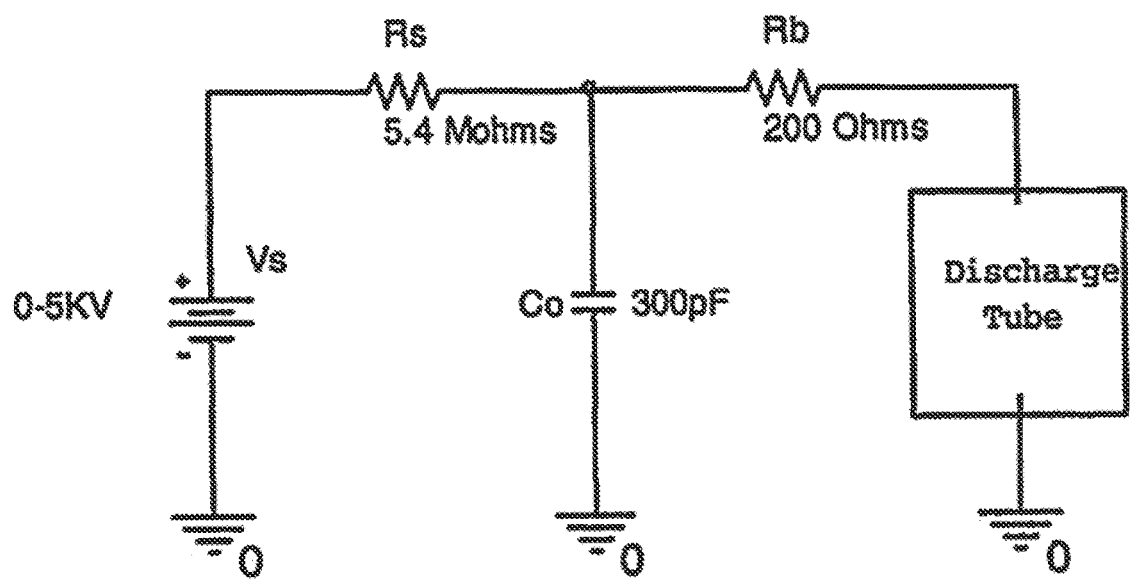
FIG. 16 shows a typical external system that can achieve the plasma discharge exhibiting a glow like nature as compared to a harsh arc-like explosive effect, under the right pressures (between 5 Torr and 100 Torr)

At higher pressures, the Paschen breakdown voltage increases allowing for more electrons to collect on the plate electrodes and hence the driving force field to increase. When the Paschen voltage is attained, the electrons are discharged. Unless the source driving the discharge can maintain the current drawn, the discharge will extinguish. With a simple ballast resistor and capacitor bank, the pulse repetition rate may be varied giving the constricted plasma wire a fast pulse like nature. Under the right pressures (between 5 Torr and 100 Torr) and pulsed power conditions, the plasma discharge exhibits a glow like nature as compared to a harsh arc-like explosive effect. A typical external electrical system that can achieve this characteristic is given in FIG. 16 with the discharge tube pictured in FIG. 6A, FIG. 6B, FIG. 12A, and FIG. 12B. Furthermore, limiting the charging current also affects the off duration of the pulse and hence period of oscillation. A typical pulsed power plasma discharge is shown in FIG. 3B and FIG. 12B.

Figure 17A:
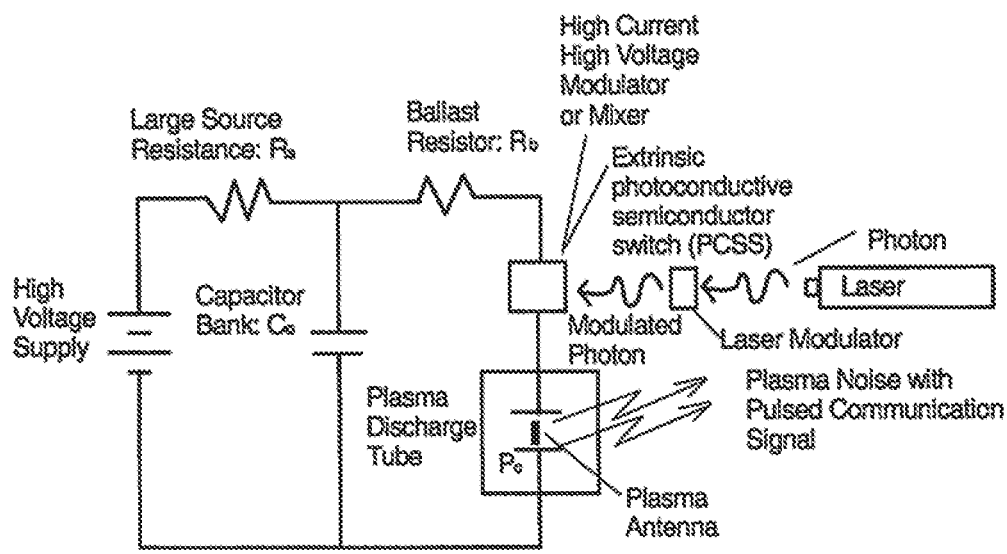
FIG. 17A, 17B illustrate a schematic that will under appropriate conditions modulate the beam electrons in the plasma discharge.
Figure 17B:
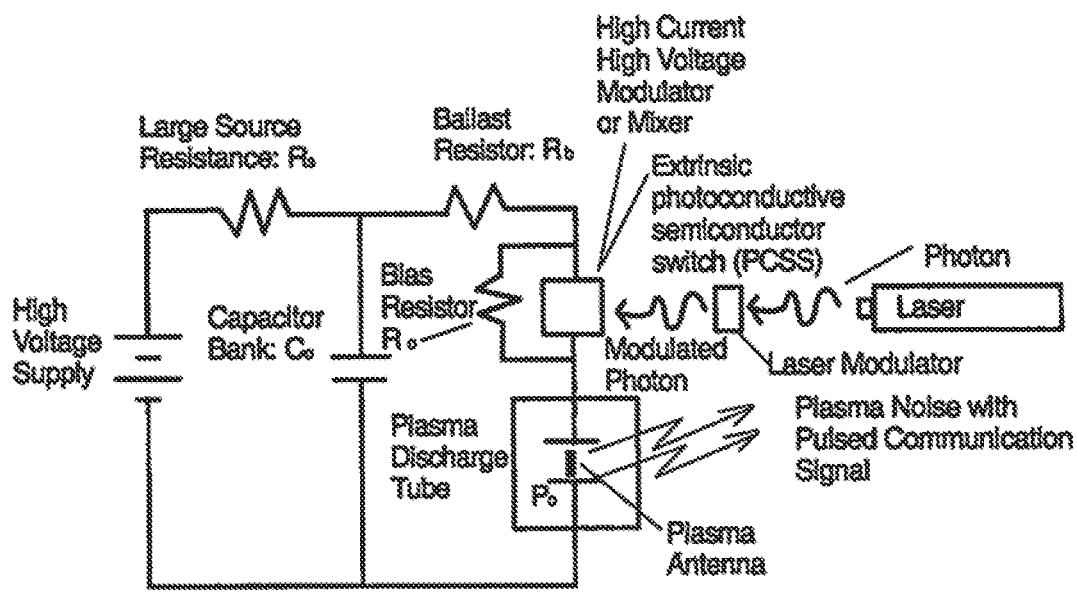

By modulating the discharge current or some fraction of the current, one can embed a communication signal in the plasma discharge. The modulating current is supported by the beam electrons. By knowing the pulse repetition rate of the discharge carrying the communication signal, one can filter out the plasma noise and demodulate the pulsed carrier to reproduce the communication signal. FIG. 17A and FIG. 17B illustrate a schematic that will under appropriate conditions modulate the beam electrons in the plasma discharge. A bias resistor may be necessary to maintain the discharge over the duration of the source pulse while current modulation is being performed with the extrinsic photoconductive semiconductor switch operated in linear mode. The laser light itself is amplitude modulated with an electro-optic or acousto-optic device.

Figure 18:
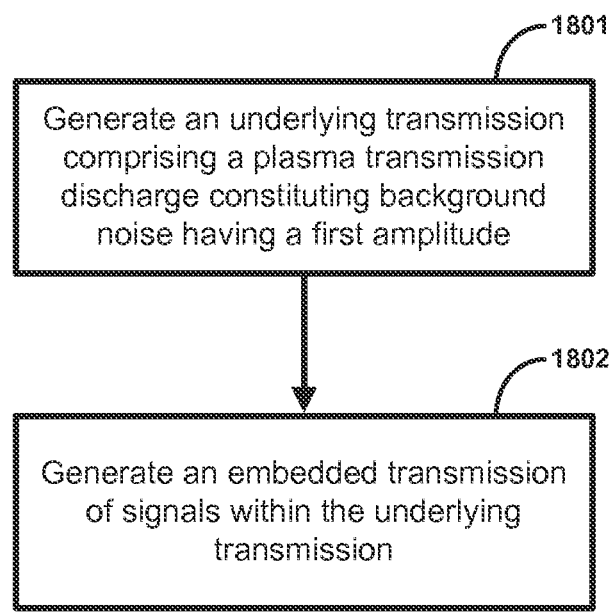
FIG. 18 illustrates an example method.

In an aspect, illustrated in FIG. 18, provided are methods of transmitting a camouflaged transmission of signals comprising generating an underlying transmission comprising a plasma transmission discharge constituting background noise having a first amplitude at 1801 and generating an embedded transmission of signals within the underlying transmission at 1802. In another aspect, the underlying transmission can comprise a known structure of plasma transmission discharge. In a further aspect, the underlying transmission can comprise a random structure of plasma transmission discharge. In another aspect, the embedded transmission of signals within the underlying transmission can have a known structure and that known structure can be extracted from the camouflaged transmission of signals. The transmitted camouflaged signals can be received and a known structure of plasma transmission discharge can be bandpass filtered to reveal the embedded transmission. In an aspect, at least a percentage (e.g., 90%, 95%, or 100%) of the embedded transmission can have a second amplitude within the first amplitude of the underlying transmission.

Figure 19:
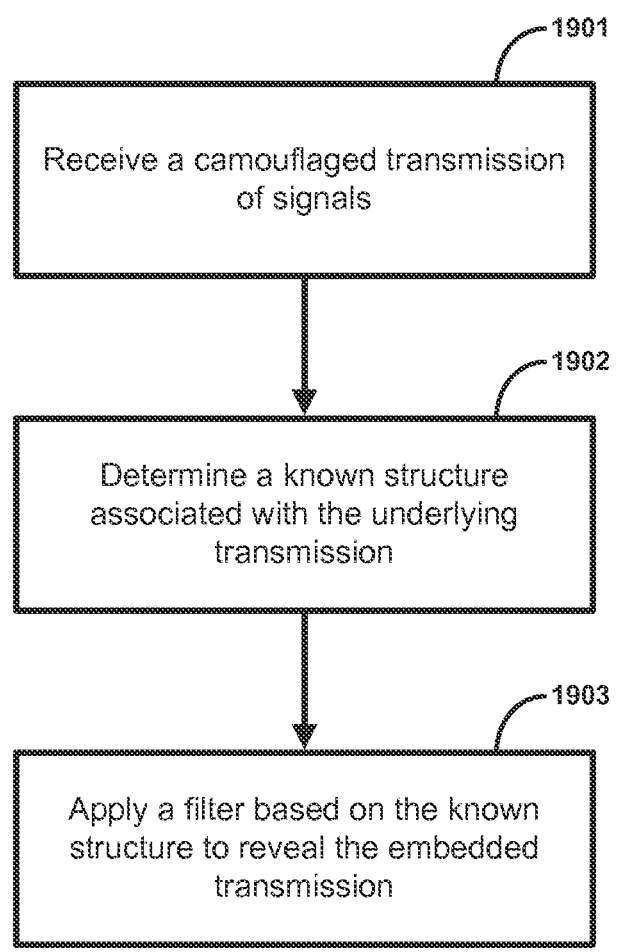
FIG. 19 illustrates another example method.

In another aspect, illustrated in FIG. 19, provided are methods comprising receiving a camouflaged transmission of signals at 1901, determining a known structure associated with the underlying transmission at 1902, and applying a filter based on the known structure to reveal the embedded transmission at 1903. In an aspect, the camouflaged transmission of signals can comprise an underlying transmission comprising a plasma transmission discharge constituting background noise having a first amplitude and an embedded transmission of signals. In an aspect, at least a percentage (e.g., 90%, 95%, or 100%) of the embedded transmission can have a second amplitude within the first amplitude of the underlying transmission. By way of example, applying a filter can comprise applying a bandpass filter.

Figure 20:
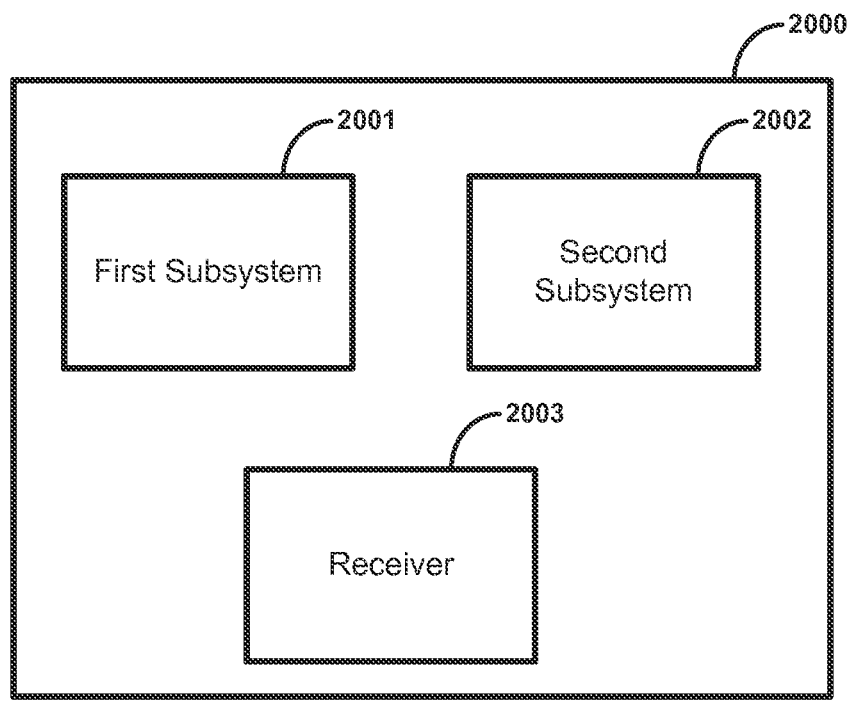
FIG. 20 illustrates an example system.

In another aspect, illustrated in FIG. 20, provided is a system 2000 for the generation, transmission and reception of a camouflaged transmission of signals comprising a first subsystem 2001 configured to generate an underlying transmission comprising a plasma transmission discharge constituting background noise having a first amplitude. The system 2000 can further comprise a second subsystem 2002 configured to generate an embedded transmission of signals within the underlying transmission. In an aspect, at least a percentage (e.g., 90%, 95%, or 100%) of the embedded transmission can have a second amplitude within the first amplitude of the underlying transmission. The system 2000 can further comprise a receiver 2003 configured to receive the camouflaged transmission of signals and extract the embedded transmission of signals from the camouflaged transmission of signals.

In an aspect, the receiver 2003 can comprise a processor having informational knowledge of structure existing in the underlying transmission. The processor can be configured to extract known structure of the underlying transmission from the camouflaged transmission to leave a readable structure of embedded transmission of signals. In a further aspect, the receiver 2003 can comprise a processor having informational knowledge of structure existing in the embedded transmission. The processor can be configured to extract known structure of the embedded transmission from the camouflaged transmission to provide a readable structure of embedded transmission of signals.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Throughout this application, various publications are referenced. The disclosures of these publications in their entireties are hereby incorporated by reference into this application in order to more fully describe the state of the art to which the methods and systems pertain.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed:

1. A method of transmitting a camouflaged transmission of signals comprising:
    generating an underlying transmission comprising a plasma transmission discharge constituting background noise having a first amplitude; and
    generating an embedded transmission of signals within the underlying transmission, at least a percentage of the embedded transmission having a second amplitude within the first amplitude of the underlying transmission.

2. The method of claim 1 wherein the percentage is 90%, 95%, or 100%.

3. The method of claim 1 wherein the underlying transmission comprises a known structure of plasma transmission discharge.

4. The method of claim 3 wherein the transmitted camouflaged signals are received and the known structure of plasma transmission discharge is bandpass filtered to reveal the embedded transmission.

5. The method of claim 1 wherein the underlying transmission comprises a random structure of plasma transmission discharge.

6. The method of claim 1 wherein the embedded transmission of signals within the underlying transmission has a known structure and that known structure is extracted from the camouflaged transmission of signals.

7. A method comprising:
    receiving a camouflaged transmission of signals,
        wherein the camouflaged transmission of signals comprises an underlying transmission comprising a plasma transmission discharge constituting background noise having a first amplitude and an embedded transmission of signals, and
        wherein at least a percentage of the embedded transmission has a second amplitude within the first amplitude of the underlying transmission;
    determining a known structure of the plasma transmission discharge associated with the underlying transmission; and
    applying a filter based on the known structure of the plasma transmission discharge to reveal the embedded transmission.

8. The method of claim 7 wherein the percentage is 90%, 95%, or 100%.

9. The method of claim 7, wherein applying a filter based on the known structure of the plasma transmission discharge to reveal the embedded transmission comprises applying a bandpass filter.

10. A system for the generation, transmission and reception of a camouflaged transmission of signals comprising:
    a first subsystem configured to generate an underlying transmission comprising a plasma transmission discharge constituting background noise having a first amplitude;
    a second subsystem configured to generate an embedded transmission of signals within the underlying transmission, at least 90% of the embedded transmission having a second amplitude within the first amplitude of the underlying transmission; and a receiver configured to receive the camouflaged transmission of signals and extract the embedded transmission of signals from the camouflaged transmission of signals.

11. The system of claim 10 wherein the receiver comprises a processor having informational knowledge of structure existing in the underlying transmission, and the processor is configured to extract known structure of the underlying transmission from the camouflaged transmission to leave a readable structure of embedded transmission of signals.

12. The system of claim 10 wherein the receiver comprises a processor having informational knowledge of structure existing in the embedded transmission, and the processor is configured to extract known structure of the embedded transmission from the camouflaged transmission to provide a readable structure of embedded transmission of signals.

* * * * *